(12) United States Patent
Dennis et al.

(10) Patent No.: US 10,965,742 B2
(45) Date of Patent: Mar. 30, 2021

(54) MIGRATION PROJECT AUTOMATION, E.G., AUTOMATED SELLING, PLANNING, MIGRATION AND CONFIGURATION OF EMAIL SYSTEMS

(71) Applicant: SkyKick, Inc., Seattle, WA (US)

(72) Inventors: John Dennis, Berkeley, CA (US); Evan Richman, Seattle, WA (US); Todd Schwartz, Seattle, WA (US); Trent Schwartz, Seattle, WA (US); Rick Tett, Plano, TX (US); Brad Younge, Parker, CO (US)

(73) Assignee: SkyKick, Inc., Seattle, WA (US)

( * ) Notice: Subject to any disclaimer, the term of this patent is extended or adjusted under 35 U.S.C. 154(b) by 992 days.

(21) Appl. No.: 13/766,761

(22) Filed: Feb. 13, 2013

(65) Prior Publication Data

US 2013/0212200 A1 Aug. 15, 2013

Related U.S. Application Data

(60) Provisional application No. 61/598,032, filed on Feb. 13, 2012.

(51) Int. Cl.
*G06F 16/951* (2019.01)
*H04L 29/08* (2006.01)
(Continued)

(52) U.S. Cl.
CPC ........ *H04L 67/1095* (2013.01); *G06F 16/951* (2019.01); *H04L 51/22* (2013.01); *H04L 61/1511* (2013.01)

(58) Field of Classification Search
CPC ....... H04L 51/22; H04L 51/32; H04L 63/126; H04L 69/22; H04L 51/02; H04L 67/1095;
(Continued)

(56) References Cited

U.S. PATENT DOCUMENTS 4,827,478 A 5/1989 Chan et al.
5,526,482 A 6/1996 Stallmo et al.
(Continued)

FOREIGN PATENT DOCUMENTS

EP 1215590 5/2007
WO 2013123097 8/2013
(Continued)

OTHER PUBLICATIONS

Henseler, Network-based filtering for large email collections in E-Discover, Dec. 23, 2010, Springer Science_Business Media B.B. 2010, pp. 413-430.*

(Continued)

*Primary Examiner* — Backhean Tiv
*Assistant Examiner* — Linh T. Nguyen
(74) *Attorney, Agent, or Firm* — Perkins Coie LLP

(57) ABSTRACT

Technology is generally described for automating the project management and execution of data migration from a source email system to a destination email system. In some examples, the technology can include receiving a domain name of a second computing system; obtaining domain name system (DNS) records for the received domain name; determining an email hosting provider for the second computing system; determining, by the processor, based on the obtained DNS records, an email system service type of the source email system on the second computing system; discovering mailboxes and message delivery rules of the source email system; displaying customization options for migrating discovered source email system mailboxes; migrating data items from the source email system to the destination email system; and managing migration of data from source email system client computing devices to the destination email system.

27 Claims, 23 Drawing Sheets

(51) Int. Cl.
*H04L 12/58* (2006.01)
*H04L 29/12* (2006.01)

(58) Field of Classification Search
CPC ... H04L 63/0227; H04L 63/102; H04L 51/18; H04L 51/24; H04L 61/307; H04L 29/12009; G06F 3/0647; G06F 11/203; G06F 21/31; G06F 17/30575; G06F 17/30578; G06F 17/30932; G06F 8/60; G06F 12/0875; G06F 17/30716; G06F 17/30722; G06F 21/00; G06F 21/50; G06F 21/552; G06F 3/011; G06F 17/30339; G06F 17/30705; G06F 9/5088; G06F 17/30994; G06F 17/30598; G06F 17/30961; G06F 17/30477; G06F 17/30675; G06F 8/34; G06F 11/1458; G06F 16/24578; G06F 16/288; G06F 16/9024; G06Q 10/06; G06Q 10/103; G06Q 10/10; G06Q 50/01; H04W 4/14; H04W 4/12; H04W 8/20
USPC ....... 709/206, 219, 227, 217, 238, 203, 245; 707/737, 797, 798, E17.03, E17.093, 738, 707/749

See application file for complete search history.

(56) References Cited

U.S. PATENT DOCUMENTS

| | | | |
|---|---|---|---|
| 6,018,762 A * | 1/2000 | Brunson | G06Q 10/107 709/206 |
| 6,434,682 B1 | 8/2002 | Ashton et al. | |
| 6,735,691 B1 | 5/2004 | Capps et al. | |
| 7,284,045 B1 | 10/2007 | Marl et al. | |
| 7,426,181 B1 | 9/2008 | Feroz et al. | |
| 7,587,455 B2 | 9/2009 | Czeczulin | |
| 7,603,419 B2 | 10/2009 | Gardner et al. | |
| 7,647,411 B1 | 1/2010 | Schiavone et al. | |
| 7,734,889 B1 | 6/2010 | Todd et al. | |
| 7,761,609 B1 | 7/2010 | Srinivasan et al. | |
| 7,809,598 B2 | 10/2010 | DelGaudio et al. | |
| 7,814,540 B1 * | 10/2010 | Liao | H04L 51/066 713/153 |
| 7,953,707 B2 | 5/2011 | Hamel et al. | |
| 8,224,924 B2 * | 7/2012 | Andersen et al. | 709/217 |
| 8,285,817 B1 | 10/2012 | Balasubramanian et al. | |
| 8,316,293 B2 | 11/2012 | Virk et al. | |
| 8,447,826 B1 | 5/2013 | Manmohan et al. | |
| 8,738,634 B1 * | 5/2014 | Roth | H04L 51/22 707/748 |
| 8,812,448 B1 | 8/2014 | Anderson et al. | |
| 9,087,088 B1 * | 7/2015 | Bose | G06F 17/30312 |
| 9,207,873 B2 | 12/2015 | Nelson | |
| 9,582,524 B1 | 2/2017 | Murali et al. | |
| 9,654,436 B2 | 5/2017 | Greinhofer et al. | |
| 9,729,488 B2 | 8/2017 | Pouzin et al. | |
| 10,592,483 B2 | 3/2020 | Dennis et al. | |
| 2002/0188732 A1 | 12/2002 | Buckman et al. | |
| 2004/0005040 A1 | 1/2004 | Owens et al. | |
| 2004/0122905 A1 | 6/2004 | Smith | G06Q 10/107 709/206 |
| 2004/0236749 A1 * | 11/2004 | Cortright et al. | 707/9 |
| 2004/0236999 A1 | 11/2004 | Bezuidenhout | |
| 2004/0254991 A1 * | 12/2004 | Malik | H04L 51/28 709/206 |
| 2005/1008645 | 4/2005 | Hohman | |
| 2005/0192992 A1 * | 9/2005 | Reed et al. | 707/101 |
| 2005/0198125 A1 * | 9/2005 | Macleod Beck | G06Q 10/107 709/204 |
| 2005/0267938 A1 | 12/2005 | Czeczulin | |
| 2005/0289182 A1 * | 12/2005 | Pandian et al. | 707/104.1 |
| 2006/0041636 A1 * | 2/2006 | Ballinger | H04L 67/16 709/218 |
| 2006/0075287 A1 | 4/2006 | Vageline et al. | |
| 2006/0080422 A1 * | 4/2006 | Huberman | G06Q 10/10 709/223 |
| 2006/0104423 A1 | 5/2006 | Heidloff et al. | |
| 2007/0061393 A1 | 3/2007 | Moore | |
| 2007/0073818 A1 | 3/2007 | Gardner et al. | |
| 2007/0180509 A1 | 8/2007 | Swartz et al. | |
| 2007/0226304 A1 | 9/2007 | Virk et al. | |
| 2007/0244996 A1 | 10/2007 | Ahmed et al. | |
| 2007/0271341 A1 * | 11/2007 | Kumar et al. | 709/206 |
| 2008/0028100 A1 | 1/2008 | Adelman et al. | |
| 2008/0109448 A1 | 5/2008 | Aboel-Nil et al. | |
| 2008/0201433 A1 * | 8/2008 | McDonald | 709/206 |
| 2008/0256321 A1 | 10/2008 | Armstrong | |
| 2008/0301329 A1 | 12/2008 | Arima | |
| 2008/0306986 A1 * | 12/2008 | Doyle, Sr. | G06F 9/44 707/102 |
| 2008/0307178 A1 | 12/2008 | Agombar et al. | |
| 2009/0109872 A1 * | 4/2009 | Skubacz | H04L 41/14 370/254 |
| 2009/0187632 A1 | 7/2009 | Alarid et al. | |
| 2009/0216728 A1 * | 8/2009 | Brainerd | G06F 17/30994 |
| 2009/0222413 A1 * | 9/2009 | Mattox | G06F 17/303 |
| 2009/0327192 A1 * | 12/2009 | Galgali et al. | 706/47 |
| 2010/0036813 A1 | 2/2010 | Cameron et al. | |
| 2010/0082777 A1 * | 4/2010 | Montgomery | H04L 51/28 709/220 |
| 2010/0131728 A1 | 5/2010 | Miyamae et al. | |
| 2010/0172378 A1 | 7/2010 | Arye et al. | |
| 2010/0239255 A1 | 9/2010 | Ikeda et al. | |
| 2011/0004629 A1 | 1/2011 | Thorat et al. | |
| 2011/0103682 A1 * | 5/2011 | Chidlovskii | G06K 9/6284 382/159 |
| 2011/0264748 A1 | 10/2011 | Pouzin et al. | |
| 2011/0295925 A1 | 12/2011 | Lieblich et al. | |
| 2011/0307804 A1 * | 12/2011 | Spierer | G06Q 10/107 715/752 |
| 2011/0320754 A1 | 12/2011 | Ichikawa et al. | |
| 2012/0143894 A1 * | 6/2012 | Ferguson et al. | 707/769 |
| 2012/0158896 A1 | 6/2012 | Tamiya | |
| 2012/0185926 A1 * | 7/2012 | Topatan et al. | 726/7 |
| 2012/0203821 A1 * | 8/2012 | Czajka | G06F 15/16 709/203 |
| 2012/0246720 A1 * | 9/2012 | Xie | H04L 51/12 726/22 |
| 2012/0303814 A1 | 11/2012 | Ferris et al. | |
| 2013/0061056 A1 | 3/2013 | Proudler et al. | |
| 2013/0104251 A1 | 4/2013 | Moore et al. | |
| 2013/0124524 A1 * | 5/2013 | Anderson | G06F 17/30286 707/737 |
| 2013/0262638 A1 | 10/2013 | Kumarasamy et al. | |
| 2013/0291060 A1 | 10/2013 | Moore | |
| 2013/0325800 A1 | 12/2013 | Halevy et al. | |
| 2015/0212897 A1 | 7/2015 | Kottomtharayll et al. | |
| 2015/0294488 A1 * | 10/2015 | Iwasaki | G06T 11/206 345/440 |
| 2015/0331774 A1 | 11/2015 | Slik | |
| 2015/0373106 A1 | 12/2015 | Dennis et al. | |
| 2016/0004820 A1 | 1/2016 | Moore | |
| 2016/0134571 A1 | 5/2016 | Lindley et al. | |
| 2016/0253339 A1 | 9/2016 | Ambrose et al. | |
| 2016/0261584 A1 | 9/2016 | Dennis et al. | |
| 2016/0292152 A1 | 10/2016 | Dennis et al. | |
| 2017/0286565 A1 * | 10/2017 | Brave | G06F 16/9024 |
| 2020/0042558 A1 * | 2/2020 | Brave | G06Q 10/00 |

FOREIGN PATENT DOCUMENTS

WO 2013123097 A1 8/2013
WO 2015006308 1/2015

OTHER PUBLICATIONS

Zhou, Mining organizational emails for social networks with application to Enron Corpus, 2018, ProQuest LLC, pp. 1-180.*
StackOverflow, 403 Forbidden vs 401 Unauthorized HTTP responses, Jul. 21, 2010, pp. 1-7.*

(56) References Cited

OTHER PUBLICATIONS

TestingWhiz; Automated Test Script Execution; Jun. 10, 2013; pp. 1-8.*

Tim Berners-Lee; Web Services; Aug. 27, 2009; pp. 1-10.*

Henseler; Network-based filtering for large email collections in E-Discovery—Springer Science+Business Media B.V. 2010—Published online: Dec. 23, 2010—pp. 413-430 (Year: 2010).*

International Searching Authority, International Search Report and Written Opinion, PCT Patent Application PCT/US2013/026000, dated Jun. 21, 2013, 11 pages.

Nadhan, A Strategic Approach to Data Transfer Methods, Available online at: https://msdn.microsoft.com/en-us/library/aa480064.aspx, 2016, pp. 1-16.

* cited by examiner

FIG. 16

☐ Share Your Info & Admin Access

*Required

Your Info:

Your Name:*
Your Email Address:* [johndoe@biz.com]
Your Phone Number:*
Preferred Way to Contact? ○ Email
○ Phone
○ Text

Alternate Contact: (Optional):
Name:
Email Address:
Phone Number:

Words go here:

Desired Migration Date:* [5/25/2012]

— 1601

Based on the business email you gave us we determined: — 1602

Email Hoster: [Hosting Company Name]

Email Registrar: [Registrar Company Name] — 1603

In order to lorem ipsum, we will need you to share: — 1604
EMAIL HOSTER:

Admin User Name:*
Admin Password:*

EMAIL REGISTRAR: — 1605

Admin User Name:*
Admin Password:*

[Submit] — 1606

Select a Plan

Do you have Office 365?
- ○ Yes, currently subscribing
- ○ Yes, but only a trial version
- ● No Does anyone in your organization use a Blackberry®?
- ● Yes
- ○ No Do you need web-only access for some of your employee?
- ● Yes
- ○ No Legal compliance question goes here? _Do you need Legal Hold or Legal Search?_
- ● Yes
- ○ No Will your business expand to over 50 employees in the coming year?
- ● Yes
- ○ No

[Submit]

*FIG. 17*

⊖ ■☐ Verify Your Mailboxes

These are the mailboxes we found at your current hoster that we will migrate to Office 365. Please confirm each mailboxes to migrate.

Employee Mailbox Accounts (5)                                                                    1801

| ACCOUNT NAME | Aliases | |
|---|---|---|
| Name@BizName.com | Nickname@BizName.com, FiLastName@BizName.com | ● Create Mailbox & Migrate Data<br>○ Create Mailbox but Don't Migrate Data<br>○ Remove Mailbox (e.g. no longer an employee) |
| Name@BizName.com | | ● Create Mailbox & Migrate Data<br>○ Create Mailbox but Don't Migrate Data<br>○ Remove Mailbox (e.g. no longer an employee) |
| Name@BizName.com | | ● Create Mailbox & Migrate Data<br>○ Create Mailbox but Don't Migrate Data<br>○ Remove Mailbox (e.g. no longer an employee) |
| Name@BizName.com | Nickname@BizName.com, FiLastName@BizName.com | ● Create Mailbox & Migrate Data<br>○ Create Mailbox but Don't Migrate Data<br>○ Remove Mailbox (e.g. no longer an employee) |
| Name@BizName.com | | ● Create Mailbox & Migrate Data<br>○ Create Mailbox but Don't Migrate Data<br>○ Remove Mailbox (e.g. no longer an employee) |

[Add] 1802 — Would like this to just add another row and the user fills it out. Popup would be second choice.

Distribution Lists and Forwarding Addresses                                                       1803

| ACCOUNT NAME | FORWARDING ADDRESSES | | |
|---|---|---|---|
| Name@BizName.com | Name@BizName.com,Name@BizName.com,Name@BizName.com,Name@BizName.com,Name@BizName.com, ... | Edit | Delete |
| Name@BizName.com | Name@BizName.com,Name@BizName.com,Name@BizName.com,Name@BizName.com,Name@BizName.com, ... | Edit | Delete |
| Name@BizName.com | Name@BizName.com,Name@BizName.com,Name@BizName.com,Name@BizName.com,Name@BizName.com, ... | Edit | Delete |

[Add] 1804

[Submit] 1805

*FIG. 18A*

| | | | | | |
|---|---|---|---|---|---|
| 11 | trentj@inc351.info | | ○ | ○ | ○ |
| 12 | youngeb@inc351.info | ✕ ⚙ ▶ | ○ | ● | ● |

MAILBOX ACTIONS

● Keep Individual Mailbox (Default) — 1811
○ Make Share Mailbox — 1812

Forward Email To (removes mailbox):
○ A Different Individual Mailbox (Alias) [____] — 1813
○ Group of Users (Distribution Group) — 1814
○ Delete — 1815

MIGRATION OPTIONS

● Migrate Data to this Individual Mailbox — 1816
○ Migrate Data to a Different Mailbox [____] — 1817
○ Do Not Migrate Data — 1818

[ Cancel ]  [ Update ] — 1820

Total per month: $96

[ + Add Mailbox ]

*FIG. 18B*

⊖☐ Set Up Your Subscription

Your Subscription:　　　　　　　　　　　　　　　　　　　　　　　1901

Payment Details:　　　　　　　　　　　　　　　　1902
*Required

CREDIT OR DEBIT CARD
　　　　　　　Card Number:*　　[　　　　　　]
　　　　　　　Other Number:*　 [　　　　]
　　　　　　　Expiration Date:* [　　　　]
　　　　　　　Name on Card:*　 [　　　　　　]

BILLING ADDRESS
　　　　　　　Address:*　[　　　　　　]
　　　　　　　Address:*　[　　　　　　]
　　　　　　　City:*　　 [　　　　　　]
　　　　　　　State:*　  [Please Select ▼]

1903
　　　　　　　( Submit )

*FIG. 19*

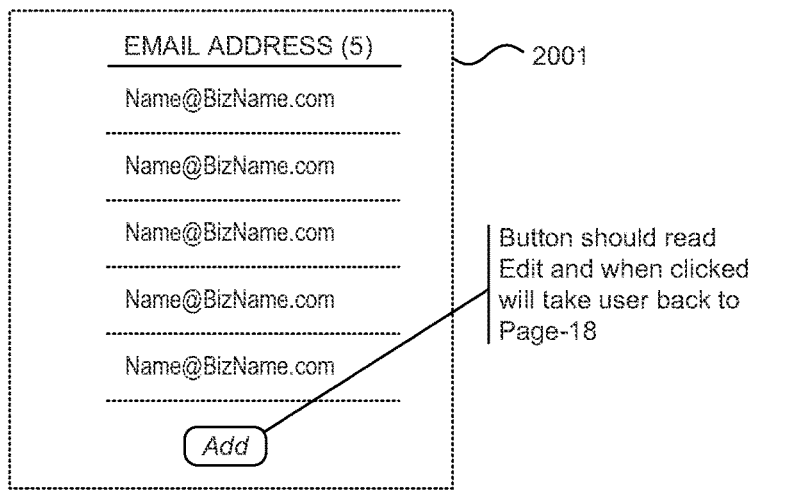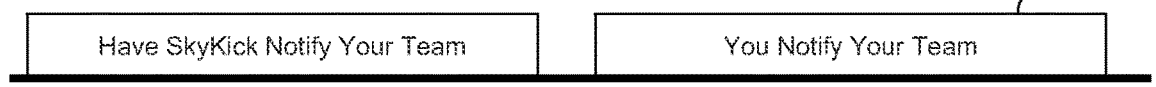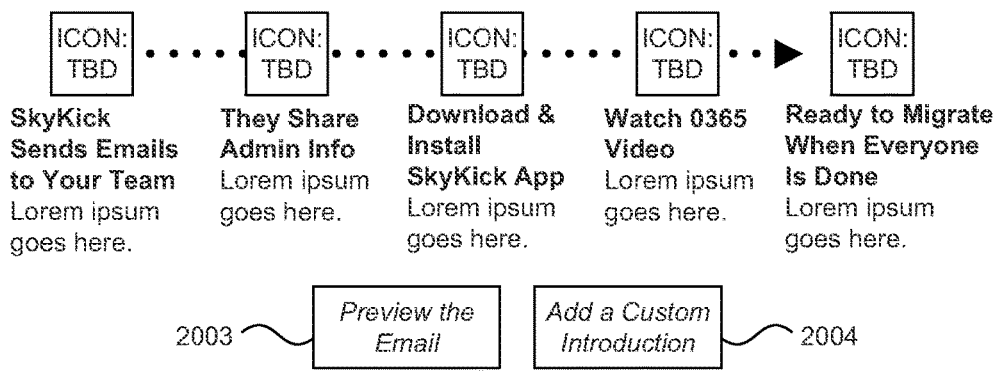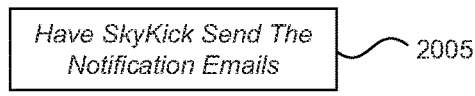
*FIG. 20*

Track Progress & Approve Migration

Migration Date: 5/25/2012  Count Down: 5 Days

Monitor the progress of you and your team.

| EMAIL ADDRESS (5) | OPENED EMAIL | SHARED ACCESS INFO | DOWNLOADED SKYKICK APP | READY TO MIGRATE | WATCHED VIDEO |
|---|---|---|---|---|---|
| Name@BizName.com | ● | ● | ● | ● | ● |
| Name@BizName.com | ● | ● | ● | ● | ○ |
| Name@BizName.com | ● | ● | ● | ● | ● |
| Name@BizName.com | ● | ● | ● | ● | ● |
| Name@BizName.com | ● | ● | ● | ● | ● |

2201

Congratulations!
Your team is prepped and ready.

SkyKick is ready to migrate your business to the cloud.
Please authorize by clicking below and we'll tell you when everything is complete.

[ Schedule Migration ] 2202

*FIG. 22*

MIGRATION PROJECT AUTOMATION, E.G., AUTOMATED SELLING, PLANNING, MIGRATION AND CONFIGURATION OF EMAIL SYSTEMS

CROSS REFERENCE TO RELATED APPLICATION

This application claims the benefit of U.S. Provisional Patent Application No. 61/598,032 filed Feb. 13, 2012, entitled "Automated selling, planning, migration and configuration of email systems", which is incorporated herein in its entirety by reference.

BACKGROUND

Migrating data to a cloud computing service such as, e.g., Microsoft® Office 365®, Google® Apps™, or Hosted Exchange, can be a complex project that requires information technology ("IT") expertise, careful planning, and significant time and expense. An email infrastructure and content system (including, e.g., email, calendar data, contact data, task data, document data, etc.) (collectively, an "email system") may, for example, be based on an obsolete computing system or an array of different systems, be heavily customized for its users, and/or be poorly documented. Data to be migrated may be stored on one or more servers and/or client computing devices that may or may not all be tightly integrated, at the same location, or even available concurrently.

To perform a project to migrate an email system from one computing system to another, with high probability to a different technology platform, and to do so without altering or losing information or requiring significant "downtime" during which the system is unavailable, generally requires IT professionals to assess the email system; choose and possibly customize appropriate software; perform a pilot migration; test the pilot project and make adjustments; and then perform and verify a complete migration.

Conventionally, this migration has been performed by IT consultants who spend considerable time and effort creating customized solutions for each customer. Moreover, traditional email migration technology ignores many of the necessary project management workloads required in a migration project, e.g., email mailbox analysis, email rules analysis, project planning and project management, process orchestration and timing, customer communications, domain name system ("DNS") configuration, and client configuration and setup.

BRIEF DESCRIPTION OF THE DRAWINGS

FIG. 16 is a display diagram illustrating a screen requesting customer contact information and administrative credentials.

FIG. 17 is a display diagram illustrating a server plan selection screen.

FIGS. 18A-B are display diagrams illustrating account migration planning screens.

FIG. 19 is a display diagram illustrating a subscription purchase screen.

FIG. 20 is a display diagram illustrating a screen with user notification options.

FIG. 22 is a display diagram illustrating a migration preparation monitoring screen.

DETAILED DESCRIPTION

Figure 1:
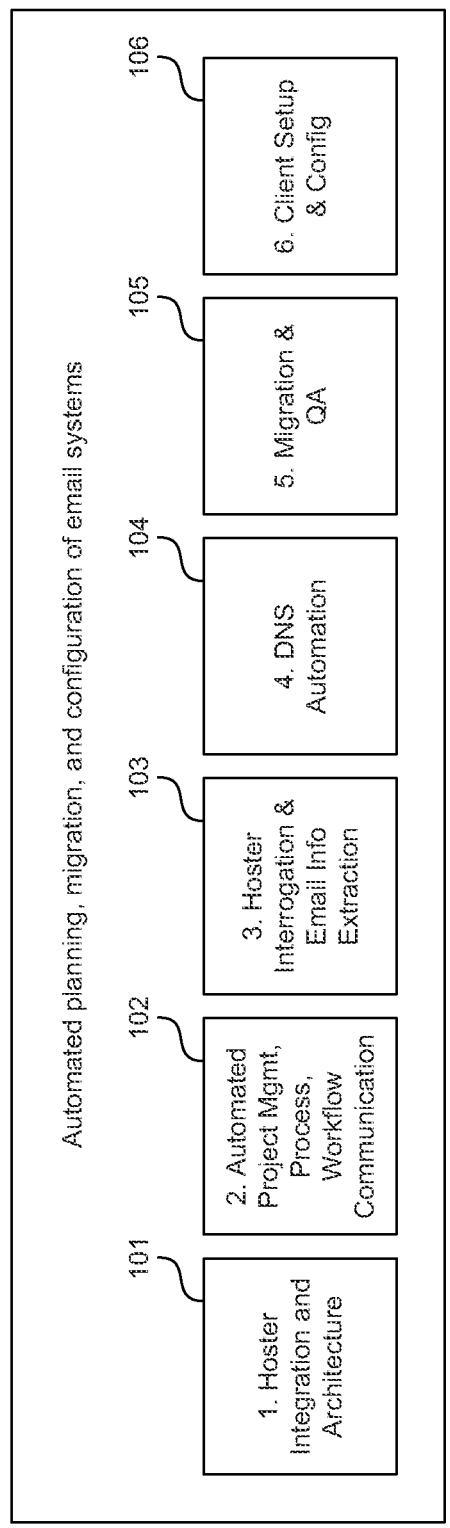
FIG. 1 is a block diagram illustrating components of some embodiments of the present disclosure.

Technology is generally disclosed for automating the project management and execution of data migration from a source email system to a destination email system ("the technology"). The technology reduces the amounts of manual work and IT professional expertise required for such a migration project (a "migration"). In various embodiments, the technology provides a "self-service" application that can be used by a non-technical user to perform a migration in an automated fashion. In some embodiments, the technology comprises one or more of the following subcomponents (FIG. 1):

A SkyKick engine subcomponent (block 102) is configured to create and maintain a customized project plan based on the architecture, system settings, and timing requirements on both the source and destination email systems; dynamically adapt the tasks depending on changes from the system workflows, hoster inputs, and customer inputs; perform quality assurance at each step; perform automated customer communications; and update the project plan and reports.

A hoster discovery subcomponent (block 101) is configured to identify a customer's current email system including but not limited to the system location (physical and virtual), the system type (e.g., Microsoft Exchange Server®, Lotus Notes®, Google Apps™, etc.), the primary communication protocol(s) that the system supports (e.g., Exchange Web Services, Web distributed authoring and versioning (WebDAV), Internet message access protocol (IMAP), post office protocol (POP), Google Data API™, etc.), and the correct format of credentials for accessing the system.

A hoster integration subcomponent (block 101) is configured to analyze a customer's email system to determine a current system architecture, server settings, port settings, and email information using a small number of non-technical inputs (e.g., an email address and password).

A mailbox discovery subcomponent (block 103) is configured to automatically interrogate a hosted email system to extract and normalize email logic and settings, e.g., a list of all mailboxes, forwarding rules, distribution groups, and aliases.

A DNS discovery and automation subcomponent (block 104) is configured to automate the discovery, relocation, quality assurance and modification of DNS settings in accordance with proper timing of the source and destination hoster(s) to successfully route email and minimize delays from the source email system to the destination email system without manual intervention.

A migration sync subcomponent (block 105) is configured to copy data from the source email system to the destination email system, including quality assurance automation, pre-migration of data, automatic coordination of what data has moved and will need to move, recurring copying of data, and on-demand data migration for users who do not provide credentials in advance.

A client application subcomponent (block 106) is configured to communicate with a user's email application to automate the timing, setup and configuration of the email application and coordinate user data migration, including migration of local data, e.g., email messages, calendar appointments, contacts, and user email application settings.

The technology reduces the amount of work that an entity performing an email system migration (a "company") and/or a reseller partner or an entity whose documents are being migrated (a "customer") must perform to successfully migrate to a destination email system. The technology also reduces the number of electronic mail messages that are delivered to the source email system after the migration has been performed and thus attempts to ensure prompt delivery of electronic mail to the destination email system.

Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Hoster Discovery

Figure 2:
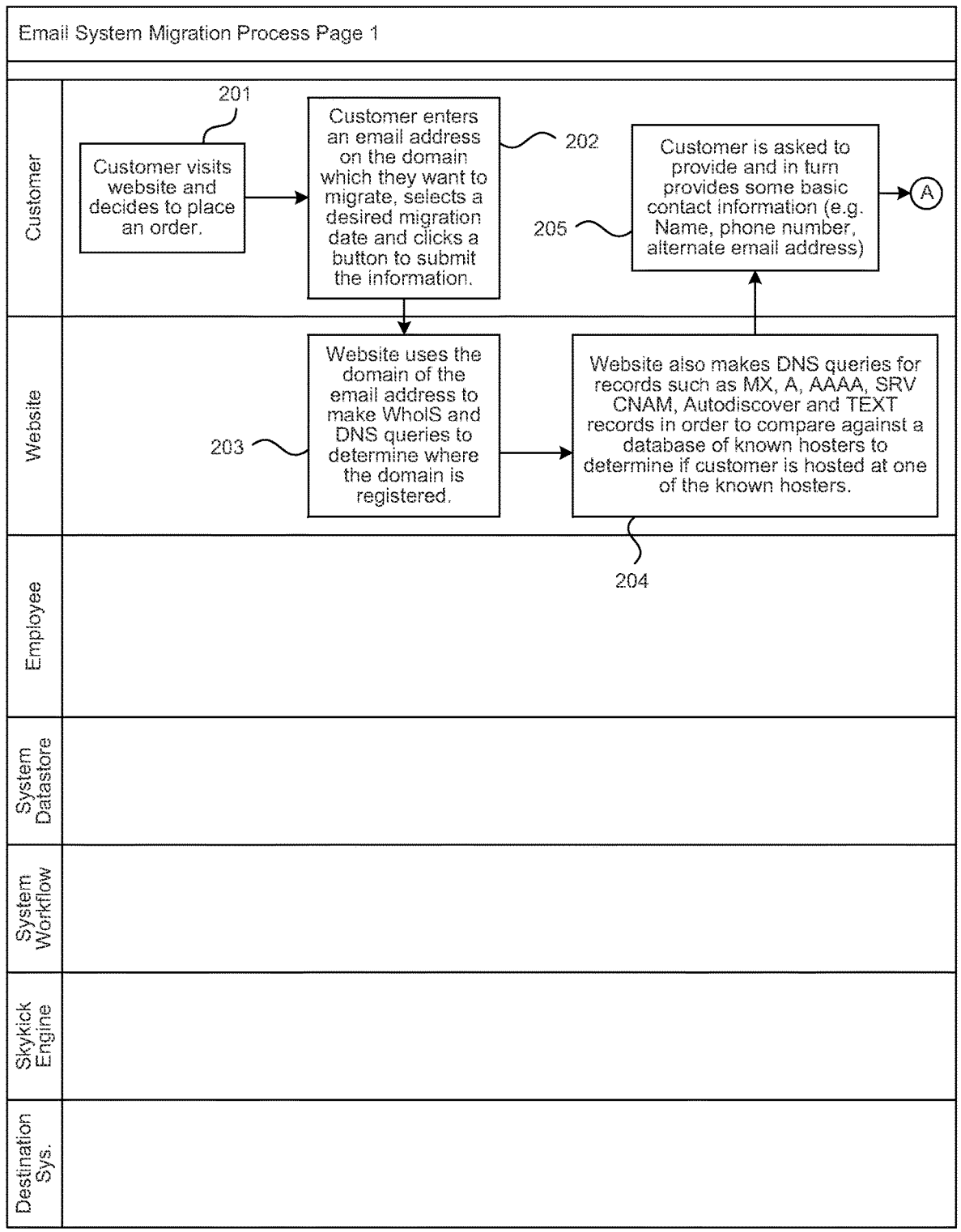
FIGS. 2-13 are flow diagrams illustrating routines performed by some embodiments of the technology to process a customer migration order.

FIG. 2 is a flow diagram illustrating a routine performed by some embodiments of the technology to process a customer migration order. The routine may begin at block 201 when, e.g., a customer representative ("user") comes to a company's website or, e.g., a partner website to place and configure a customer email system migration order. At block 202 in the illustrated embodiment, the technology prompts the user to submit an email address on the domain to be migrated and a desired date for the migration. (An illustrative example of such a prompt is described below in connection with FIG. 15.) In some embodiments, the information the user submits includes, for example, the customer's basic contact information (e.g., the customer business name, the user's first and last name, customer email address(es), phone number(s), and mailing address(es)). After the requested information is submitted, the technology performs acts such as the following to deduce the domain name registrar that the email system's domain name is registered with, the email system type and/or the Internet hosting service ("hoster") that serves the customer's email system:

At block 203, the technology uses one or more Internet domain name information ("WHOIS") databases, e.g., whois.iana.org, to find a responsible WHOIS server for the top-level domain (TLD) portion of the email system's domain name (e.g. 'com', 'org', 'info', etc.). Using the identified WHOIS service, the technology performs one or more WHOIS lookups on the domain name (e.g. 'skykick.com') to determine where the domain is registered. The technology obtains from the lookups the name and URL for the customer's domain registrar.

At block 204, the technology, using the Internet's DNS protocols, performs a DNS lookup for records including, for example, the following record types in the domain's zone: Mail Exchanger (MX) records (incoming mail servers), Address (A or AAAA) records (Internet Protocol (IP) addresses) associated with an MX record host name, any Service Location (SRV) or Canonical Name (CNAME) records (domain aliases) related to an Exchange Autodiscover service, and any TEXT records that constitute Sender Policy Framework (SPF) records (outgoing mail servers).

At block 204, the technology compares the found DNS records and IP addresses to a database of email system hosters that is created and managed by the company. This database contains one or more records for every known email system hoster. Each of these records contains information regarding possible MX, SPF, and Autodiscover values for the domains whose email systems are hosted by that hoster. In some embodiments, the technology compares found records to the database looking for matching fields in the order MX, MX IP Address, Autodiscover record, SPF record, and upon a match, the comparison is terminated. In some embodiments, the technology compares the found DNS records (up to, e.g., an exhaustive comparison of every possible record), gives a score to each match, and determines the most likely hoster based on the scores.

Those skilled in the art will appreciate that the logic illustrated in FIG. 2 and described above, and in each of the flow diagrams discussed below, may be altered in various ways. For example, the order of the logic may be rearranged, substeps may be performed in parallel, illustrated logic may be omitted, other logic may be included, etc.

Hoster Integration

Figure 3:
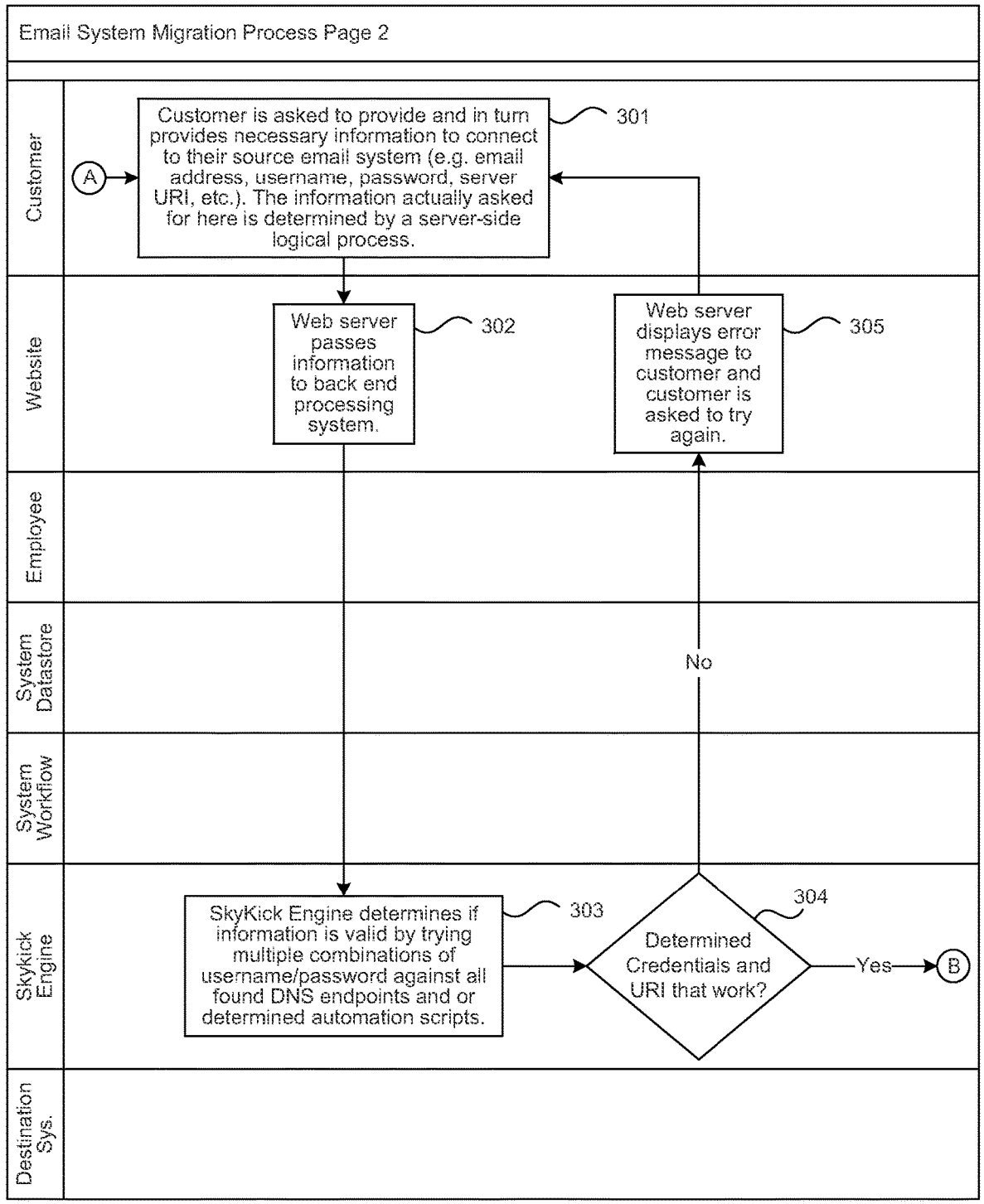

Referring now to FIG. 3, at block 301, the technology attempts to connect to an unknown mail system for a custom domain, with only the user's email address and email password to the source email system.

After receiving the user's submittal of the requested email address and password (and optionally additional connection information), the technology attempts to derive the customer email system's connection information (block 303). The technology then initiates a process to derive a connection from those values.

In some embodiments, the technology issues DNS requests to discover a list of IP addresses corresponding to host names found in the DNS zone file for the domain name portion of the provided email address. For example, the technology issues DNS requests for hostnames derived from the provided domain name, MX records, Exchange Autodiscover service records, a list of candidate host names based on possible mail-oriented subdomains (e.g., a list of hostnames such as those in the following table), and, if provided, the user-inputted hostname.

| "exchange" | "exch" | "owa" | "mail" | "email" |
|---|---|---|---|---|
| "webmail" | "m" | "imap" | "pop" | "smtp" |
| "imap1" | "imap2" | "imap3" | "imap4" | "imap5" |
| "pop1" | "pop2" | "pop3" | "pop4" | "pop5" |
| "smtp1" | "smtp2" | "smtp3" | "smtp4" | "smtp5" |
| "www" | | | | |

Each unique IP address from the resulting set is then interrogated for possible mail services by attempting to create a valid transmission control protocol ("TCP") connection to each of a set of ports associated with email systems, e.g., those in the following table.

| Port | 80 | 110 | 143 | 443 | 585 | 993 | 995 |
|---|---|---|---|---|---|---|---|
| Name | "http" | "Pop" | "imap" | "https" | "imap4-ssl" | "imaps" | "ssl-pop" |

The technology matches each valid IP address-and-port combination from the resulting set back to hostnames with subdomains that are likely to match the IP address-and-port combination, e.g., one or more lists such as the following table.

| 80 | 110 | 143 | 443 | 585 | 993 | 995 |
|---|---|---|---|---|---|---|
| "mail", | "mail", | "mail", | "mail", | "mail", | "mail", | "mail", |
| "email", | "email", | "email", | "email", | "email", | "email", | "email", |
| "webmail", | "webmail", | "webmail", | "webmail", | "webmail", | "webmail", | "webmail", |
| "m", | "m", | "m", | "m", | "m", | "m", | "m", |
| "www", | "www", | "www", | "www", | "www", | "www", | "www", |
| "exchange", | "pop", | "imap", | "exchange", | "imap", | "imap", | "pop", |
| "exch", | "pop1", | "imap1", | "exch", | "imap1", | "imap1", | "pop1", |
| "owa" | "pop2", | "imap2", | "owa", | "imap2", | "imap2", | "pop2", |
|  | "pop3", | "imap3", | "mail", | "imap3", | "imap3", | "pop3", |
|  | "pop4", | "imap4", | "email", | "imap4", | "imap4", | "pop4", |
|  | "pop5" | "imap5" | "webmail" | "imap5" | "imap5" | "pop5" |

In some embodiments, the technology creates permutations of possible system usernames using the email address and first and/or last name of the user as a starting point. The technology creates permutations of possible resource locators and credentials for each respondent IP address/port/hostname/username combination and attempts to log in to the email system under each of the resources using protocol-specific login methods. Full connection information for the highest ranking successfully connected mail protocol is then returned, e.g., using a ranking such as the following:

| Rank | Protocol |
|---|---|
| 1 | Exchange Web Services |
| 2 | WebDAV |
| 3 | IMAP |
| 4 | Exchange ActiveSync |
| 5 | POP |
| 6 | unknown |

In some embodiments, the technology chains together the above-described procedures using a functionality map, e.g., a functionality map that can be predefined. The functionality map indicates to the system the incoming and outgoing value types of a particular procedure and whether the next procedure is to be executed serially (e.g., via a blocking call) or concurrently (e.g., via a non-blocking call). At each step the valid results from the prior executed procedure are reduced by a deduplication method and used to generate the function to be run in the subsequently executed procedure. For example, Internet input/output ("I/O") calls (e.g., sent UDP packets for DNS requests, TCP connections for attempts to contact mail services on specified ports, and TCP connections used to attempt mail protocol specific login methods) are executed concurrently, while procedures that have no I/O dependency (e.g., permutative procedures) are run serially. In some embodiments, if at any point in the chain of execution a successful connection is made, currently executing and scheduled procedures that will only affect lower or same ranking mail protocols than the one returned are cancelled. Cancellation may be achieved by one or more of, e.g., two approaches. First, the technology may retain pointers to all open sockets used for outstanding Internet I/O procedures, allowing the sockets to be immediately closed regardless of their current state. Second, the technology may check a globally accessible cancellation flag at the beginning of each procedure in the functionality chain, such that setting the flag will cause downstream processes to return immediately. If any point the top-ranked mail protocol is returned successfully, the entire chain of execution ends.

In some embodiments of the technology, at the end of the connection information deriving process described above, regardless of the outcome, the technology caches a per-domain list of discovered servers and of responding mail services on those servers. If the technology makes a discovery attempt against an already-processed domain, it bypasses the DNS queries, port scans, and resource locator permutations in favor of the cached list of servers and services, improving the speed of the process for each subsequent check.

At this point, if the connection is successful, then hoster integration is deemed successful and the user is directed to the next step in the migration.

In some embodiments of the technology, if a valid connection cannot be attained by the connection information derived from the email address and password information, the technology requests further information from the user. In some embodiments, the technology uses optimization logic to determine what additional information to ask the user for (block 301). In some embodiments of the technology, the set of heuristics includes, e.g., whether the customer's email system domain DNS records (e.g., records retrieved as described in connection with FIG. 2, block 204 above) include the existence of an Exchange Autodiscover service record; whether MX, Autodiscover, or any other defining DNS records for the given domain name match one or more records in the company's hoster database; and if a match to the database is found, whether the database indicates that the hoster offers an Exchange service and/or also provides other services, e.g., POP, IMAP, and/or Microsoft Exchange ActiveSync® services. The technology may use results of the connection information deriving process (e.g., discovery of existing working mail services) as additional heuristics when calibrating the additional requested values. The values may include more detailed credential information and mail server addressing values that are specific to known or predicted mail protocols.

If the above optimization logic indicates a possible Microsoft Exchange Server®, the technology can request input of an Exchange webmail address and/or username. If the optimization logic indicates a possible IMAP or POP server that is in the company's hoster database, the technology requests an administrative username and password to the control panel for that system. If the optimization logic indicates a possible IMAP or POP server that is not in the company's database or are ambiguous, the technology requests an email server address and username for the email system to be migrated.

In some embodiments, if the user submits an administrative username and password to a known hoster site control panel, the technology triggers an automated process (e.g., a web automation script) that logs into the control panel using the provided credentials and returns a value indicating whether the login was successful or not.

Mailbox Discovery

Figure 4:
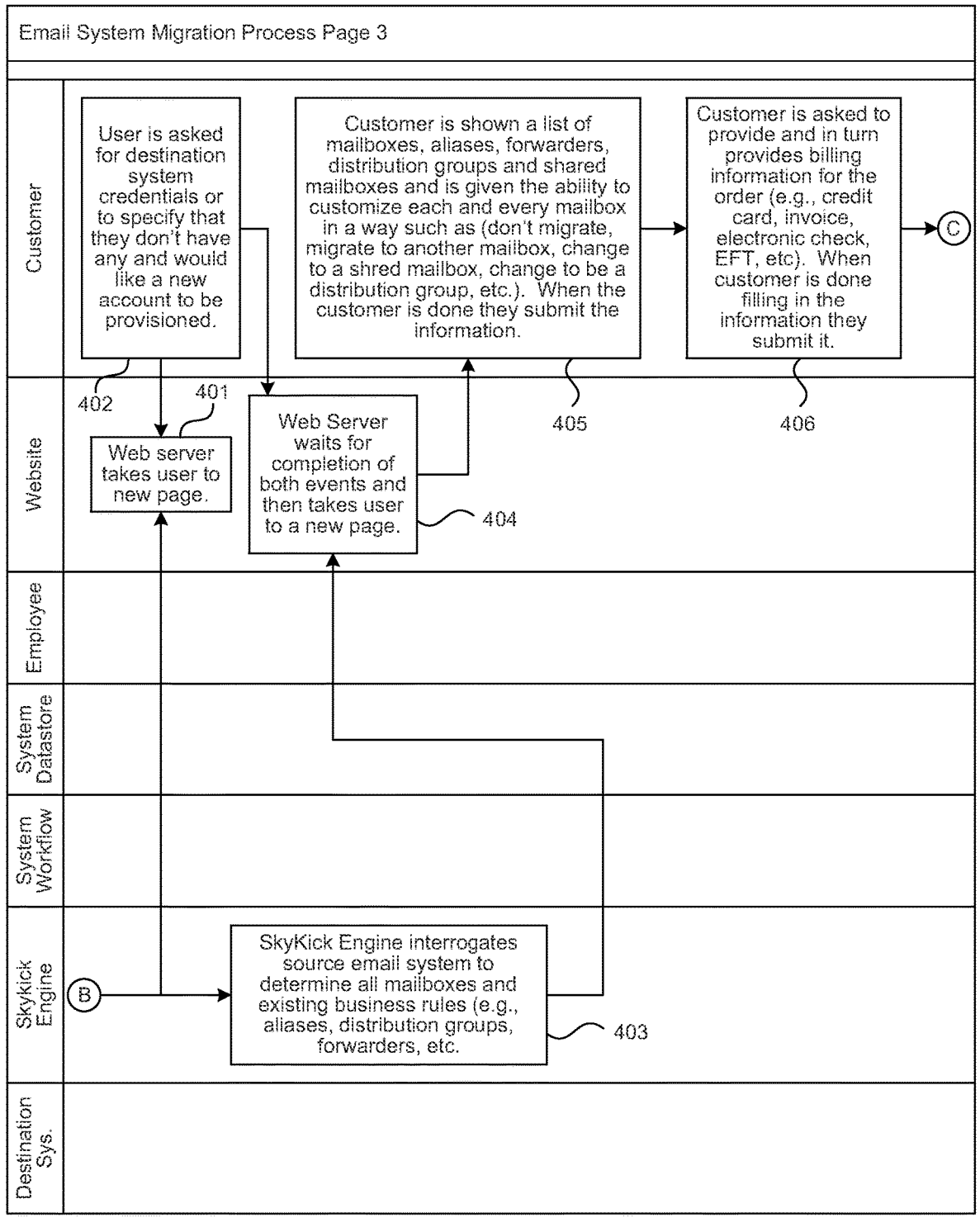

Referring now to FIG. 4, at block 403, the technology discovers the customer's email system information architecture, including, e.g., how the email system distributes incoming and outgoing email and other types of data ("business rules"). Details of business rules include, e.g., information about email addresses (e.g., existing mailboxes), aliases (email addresses that do not have a specific mailbox but point directly to (i.e., deliver all mail to) email addresses that do have a specific mailbox), forwarding rules (rules that associate a second email address with a primary email address and send all mail received at the primary address to the secondary address), distribution groups (email addresses that do not have a specific mailbox but point directly to more than one address), shared mailboxes, and other functionality on various systems. In some embodiments, the technology discovers business rules using one or more processes corresponding to different mail hosting scenarios such as, for example, those described below.

In a first scenario, the email system provides a POP or IMAP service and the email system hoster is listed in the hoster database. The technology triggers an automated process (e.g., a web automation script) that logs into the hoster control panel using the provided credentials to return all mailbox addresses, aliases, distribution groups, and forwarding rules as they are explicitly defined in that control panel.

In a second scenario, the email system provides an Exchange service with an Exchange Web Services ("EWS") connection protocol available. The technology makes Web service calls for email address resolution using every letter of the location-specific alphabet and digits 0-9. Returned addresses are consolidated into a list of unique addresses. The technology expands any addresses that the EWS protocol specifies as a distribution list type (i.e., a list of member email addresses to which mail addressed to the distribution list address is delivered) to obtain their member email addresses. The addresses and distribution list membership information are returned and the technology starts a downstream process using social graph-enabled heuristics to determine aliases, forwarding rules, and distribution list membership, as further described below.

In a third scenario, the email system provides an Exchange service with a WebDAV connection protocol available. The technology makes Web service calls for email address resolution using every letter of the location-specific alphabet and digits 0-9. Returned addresses are consolidated into a list of unique addresses. The technology attempts to login to each of the returned addresses using a set of credentials known or expected to not work. The technology uses the HTTP response of each login attempt to classify the addresses into mailbox addresses and distribution group addresses. Mailbox addresses will return 401 (failed login attempt) and distribution group addresses will return 404 (resource not found). The addresses are returned with their classifications and the technology starts a downstream process using social graph-enabled heuristics to determine aliases, forwarding rules, and distribution list membership, as further described below.

In a fourth scenario, the email system provides a POP or IMAP service and the email system hoster is not listed in the hoster database. Using the provided mailbox credentials and the discovered connection settings, the technology logs into the given mailbox using an appropriate protocol-specific method. The technology scans message headers, e.g., for a period of time or until all messages have been scanned. The technology parses address information from the to:, from:, cc:, and bcc: fields in each message header for addresses that are on the same domain as the provided address. These are returned as candidate mailbox addresses and the technology starts a downstream process using social graph-enabled heuristics to determine aliases, forwarding rules, and distribution list membership, as further described below.

Figure 6:
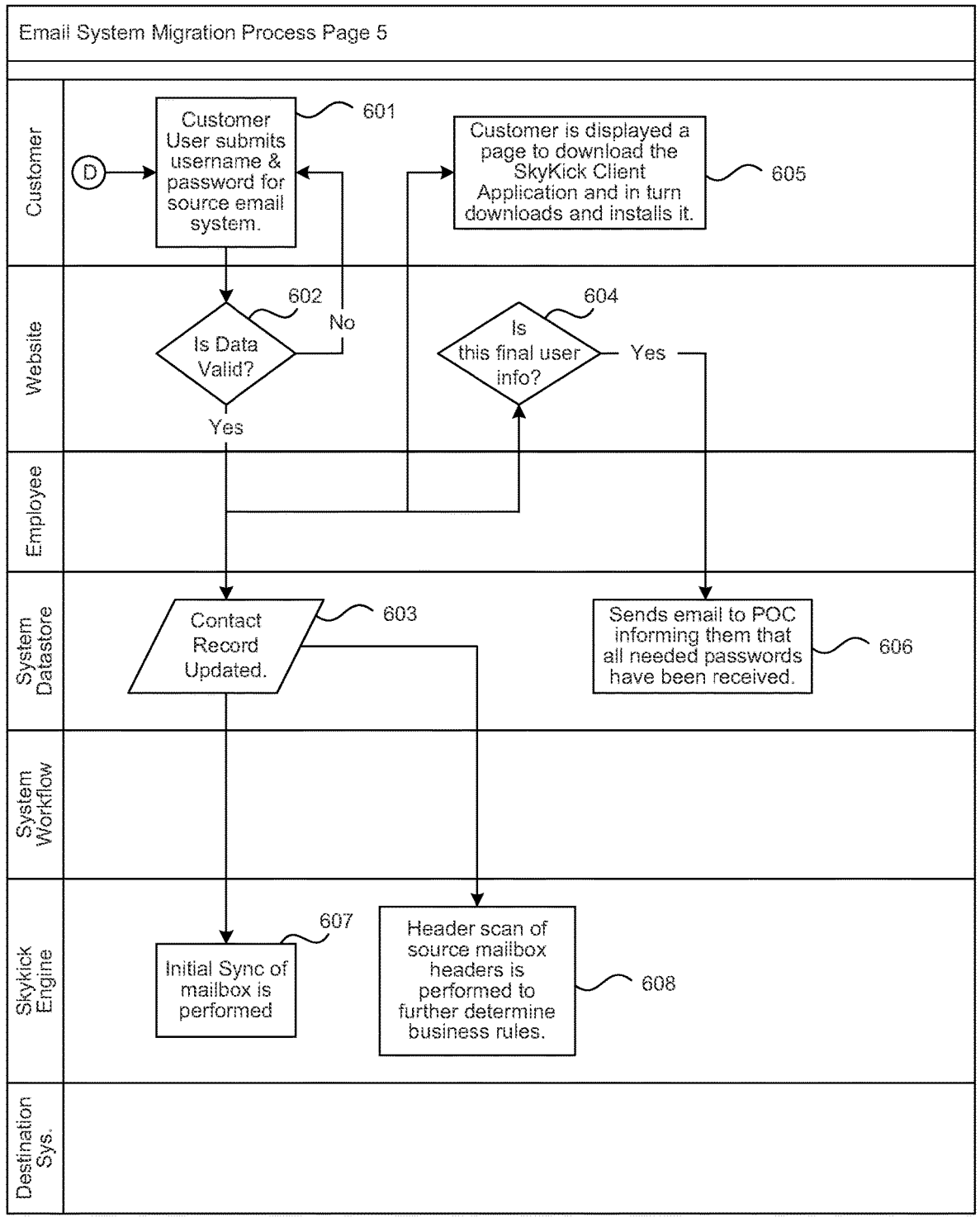

In some embodiments, as each user of the email system provides email system credentials and those credentials are tested and validated, the technology initiates a header scanning process (FIG. 6, block 608). Upon successful connection and login to a mailbox, the technology establishes a number of concurrent connections to the email system. The number of concurrent connections may be limited to avoid exceeding an estimated bandwidth limitation. The folders of the mailbox are enumerated. For each folder, a concurrent operation is started to divide the folders' contents into batches of message identifiers. For each batch, a concurrent operation is started to retrieve some or all message object headers for each message identifier found in the batch. The term "message object" includes any email system data item, including items other than email messages.

A challenge in migrating an email system (e.g., moving an entire company from one or more on-premise email servers to remote or cloud-based email servers) is that the aggregate of all users' email items can be quite large, and as a result the company's external network connection can be monopolized or severely impacted because of the bandwidth consumed by the data transfer requirements. The technology calculates and manages data transfer over the period from when a migration order is placed and when the cutover to the destination email system is completed (the "migration date"). The technology may estimate available bandwidth for data migration from the source email system and/or user devices as described below. The technology may also determine that the timing of the cutover should be adjusted to enable completion of the migration so as to impact the customer's normal Internet communications no more than necessary. A migration management system can dictate the timing of some data transfer activities, e.g., limiting some to off-peak hours and distributing individual account migrations across the period leading up to the migration date. For example, with respect to message header scanning, Internet I/O is limited throughout the process by the number of concurrent persistent protocol-specific TCP connections and by the number of threads available in the thread pools for folder and message item operations.

In some scenarios such as those described above, the technology uses a social graph-enabled heuristic to determine email business rules: In some embodiments, the technology creates a data structure from the content of the retrieved message object headers. For example, such a data structure may represent a bi-directed graph in which vertices represent either email addresses or messages, edges represent relationships based on existence of an adjacent address in the from:, to:, cc:, or bcc: field of a message, and directionality represents whether a message is going from or coming to a particular email address. The technology can utilize such a graph and heuristics such as, e.g., the following, to determine email business rules:

If the technology or a user has previously identified an address as a mailbox and/or the company has received validated credentials for a user mailbox, the address is classified as a mailbox. If the technology or a user has previously identified an address as an alias or a distribution group, the address is initially classified as an alias or distribution group, respectively.

If a number of messages exists above a threshold satisfying the following condition, the technology classifies a yet-unclassified address as an alias to the inspected mailbox: For each of the message vertices specified on all incoming edges of a inspected mailbox, the message contains no incoming or outgoing edge to the inspected mailbox and only one outgoing edge to the yet-unclassified address. In other words, at least a threshold number of messages in the mailbox are not connected by any incoming or outgoing edge to the mailbox address, and have exactly one outgoing edge to the yet-unclassified address.

If a number of incoming edges above a certain threshold and a number of outgoing edges above a certain, possibly different, threshold exist to a particular email address vertex, the email address corresponding to that vertex is classified as a mailbox.

If the previous condition is satisfied for more than one inspected address already classified as a mailbox, the yet-unclassified address is classified as a distribution list.

If the previous condition is satisfied above a possibly different threshold for an address classified as a mailbox rather than a yet-unclassified address, the relationship is classified as a forwarding rule.

Because more precision to the discovered set of rules corresponds to the amount of data in the graph, in some embodiments of the technology each addition to the graph is cached and the rules are re-run each time the graph receives more data. The business rules obtained and/or determined by the technology are in turn displayed to the customer (including, e.g., a reseller partner) so the customer can perform any further desired configuration.

In some embodiments, the technology uses the content of the retrieved message object headers to classify email addresses and associations between email addresses. The technology may de-duplicate the list of associations. Email addresses missing an associated email address are classified as existing mailboxes. Email addresses that are classified as existing mailboxes and have an associated address that is on or off the customer's domain are reclassified as forwarding rules. Email addresses that are not classified as existing mailboxes, are in the customer's domain, and have a single associated address that is on or off the customer's domain are classified as aliases. Email addresses that are not classified as existing mailboxes, are in the customer's domain, and have multiple associated addresses that are on or off the customer's domain are classified as distribution groups. Any remaining unclassified addresses may be deemed to be outside of the customer's domain and discarded, unless the technology is also applied to the domain to which the discarded addresses belong.

Migration Customization Features

In some embodiments, once the technology has returned the mailboxes for each user and associated business rules, the technology allows the user to easily customize the migration configuration for a given email address (FIG. 4, block 405). The technology enables a non-technical user to easily change, e.g., the routing rules and/or the mailbox data migration destination for any given mailbox, based on making changes in the user experience rather than code, whereas such customization has traditionally been performed by IT professionals using custom-developed code for each situation. As illustrated in FIG. 18B, the technology enables a mailbox to be routed to the same email address 1811, a different email address (alias) 1813, a group of email addresses (distribution group) 1814, a shared mailbox 1812, or be deleted 1815, while directing the data to be migrated to the same mailbox 1816, a different mailbox or a shared mailbox 1817, or to no mailbox 1818. Once the user configures the mail routing and migration options, the SkyKick engine makes the appropriate routing changes in the destination system using a variety of methods (including, e.g., API calls, Powershell commands, and/or website automation scripting). After the routing changes have been made, the SkyKick engine migrates the data to the appropriate destination, and ensures that authorized users have access to that data. Further, because numerous combinations of actions can be performed on any given mailbox, set of mailboxes, email addresses, and/or destination mailboxes, the technology ensures that any changes to the revised mail flow or data migration are not in conflict with the mailbox or mailboxes at the destination email system. For example, the technology ensures that if data is being migrated from user A to user B, then user B cannot be changed to an invalid mailbox status, thus preventing accidental data loss.

User Information Gathering

In some embodiments, the technology creates a migration contact for each of the provided users or addresses and saves other information to the system datastore (block 501). The system datastore is described below in connection with FIG. 14 (block 1402). A migration contact is a record in the system datastore that contains information about each user who has some sort of electronic document on the source email system that is to be migrated to the destination email system.

Figure 5:
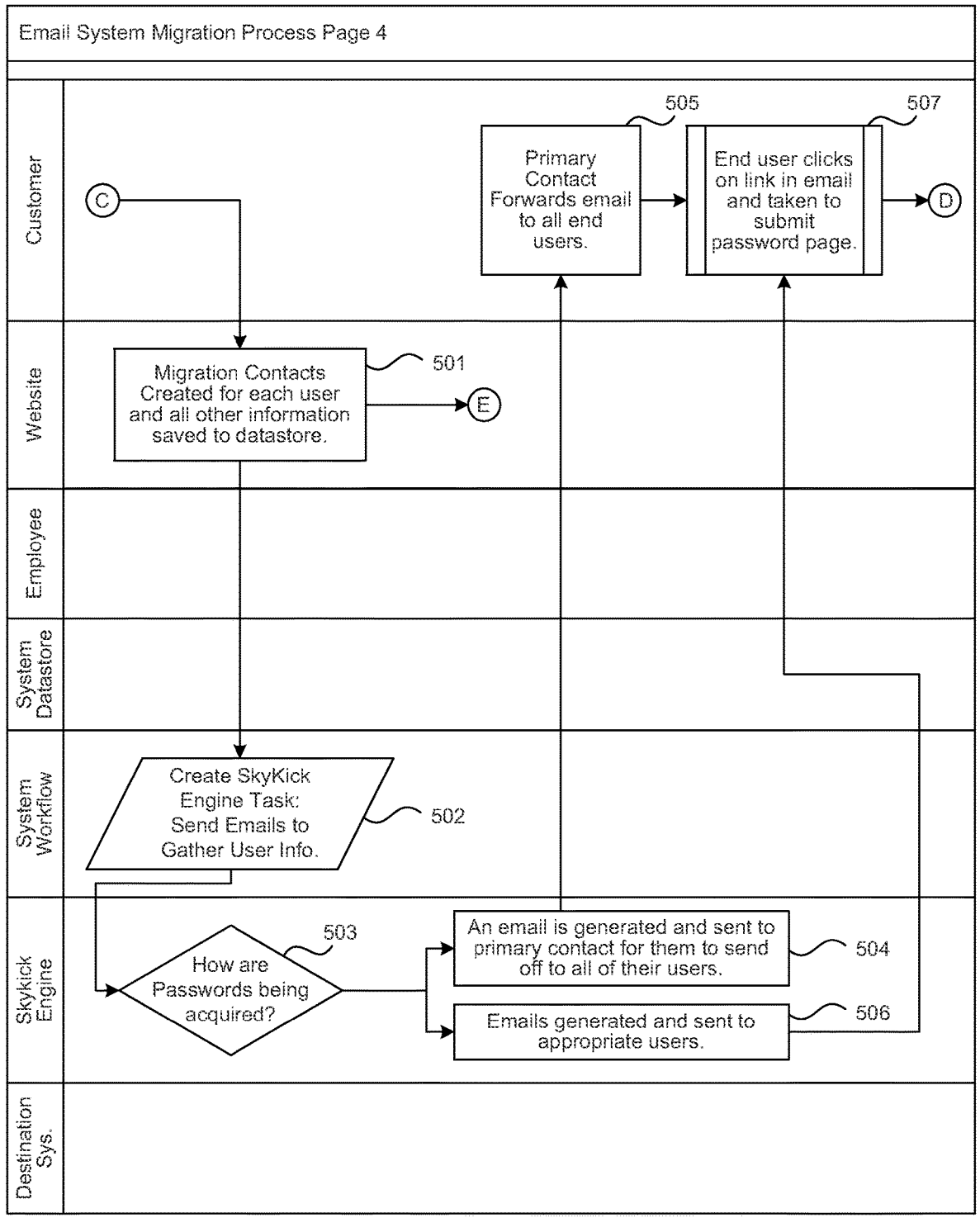

Referring again to FIG. 5, the technology updates a status indicator for the migration process ("migration status") to reflect that the technology is gathering user information and a task scheduling subcomponent of the technology (the "system workflow engine") in turn creates a record in the system datastore that instructs the SkyKick engine to perform work (a "SkyKick engine task"), e.g., to send emails to gather user information (block 502). The system workflow engine subcomponent is described below in connection with FIG. 14 (block 1401). The SkyKick engine subcomponent is described below in connection with FIG. 14 (block 1405). In some embodiments of the technology, the SkyKick engine is an asynchronous process that performs the instructed type of work over a longer period of time than is typically acceptable with a user interface and returns results via, e.g., an email to the customer, a migration status update (which may trigger other processes), creation of another SkyKick engine task, creation of a task for a company employee, etc.

Referring again to FIG. 5 (block 503), the technology may gather user information in, e.g., one or more of the following ways. If the customer specified that they would like an email to be generated and sent to the customer's primary contact, then the SkyKick engine generates and sends an email to the primary contact for the primary contact to in turn forward to each of the customer's users (blocks 504-505). If the customer specified that an email should be generated and sent directly to the customer's users, then the SkyKick engine generates and sends an email to each user (block 506). A link in the emails sent to the customer's users (block 507) takes the users to a website where they can submit their passwords (FIG. 6, block 601).

Referring now to FIG. 6, when a customer email system user submits a username and password on the website (block 601), the SkyKick engine determines whether it is valid by attempting to connect to the source email system with the supplied username and password (block 602). In some embodiments, if the credentials are not valid, the technology attempts other permutations of possible usernames such as, e.g., just the characters before the '@' sign in the customer's email address and/or provided username; the characters after the '/' sign in the user's username (if the '/' character is found in the username); the user's first name; the user's last name; the user's first name and last name combined together; the user's first name and last name combined together with a period ('.') between them; the user's first initial and last name combined; the user's first name and last initial combined; etc. If none of the attempted permutations of the user's credentials is valid, then the user is notified so with a message on the webpage and asked to resubmit the information (block 601). If any attempted combination of username and password as described above is valid, then the migration contact record is updated in the system datastore (block 603) with the valid credentials and the user may be encouraged or instructed to download and install a client application onto their computing device (block 605). Additionally, the SkyKick engine performs an initial sync (described in further detail below and illustrated in block 607) and a header scanning process (described in further detail above and illustrated in block 608). If all of the passwords work (block 604), then the technology may update the migration status to indicate that the customer's end user passwords have been received and may send a notification email to the customer (block 606).

Client Application Setup

In some embodiments, the technology includes a client application that the customer and/or individual users can download or otherwise install on computing devices from which customer data may be migrated. The technology may provide each user an option to download and install client application software on one or more of the computing or smartphone devices that they use to access the customer email system via an email application (e.g., Microsoft® Outlook).

In some embodiments, client application software is implemented in two executable components: a background executable (the "client service") and a foreground component (the "client UI"). The client service is installed in a manner to begin execution automatically when installed and each time that the operating system is restarted. Each time the client service begins execution in the user's environment, the client service looks for previously stored data associated with this software. When executing for the first time and there is no previously stored data, the client service starts the client UI, which prompts the user to enter the user's username and password credentials for the customer email system. In some embodiments, the user's email address may be used in lieu of the username; or an alternate password may be used in lieu of the user's original password. Once a username and password are entered into the client UI form fields and submitted by the user, the client UI passes the user's credentials to the client service.

The client service establishes a connection over the Internet to an online interface for the SkyKick engine and submits an authentication request to the SkyKick engine with the user's credentials along with the user's computer's hardware media access control address or addresses ("MAC address"). The SkyKick engine attempts to find a contact matching the submitted username (or email address). If none is found, or if a matching contact is found but the password does not match a password on the contact, then the SkyKick engine returns an authentication request failure to the client service, and the client service informs the client UI which displays a failure message. In either case, the user may correct and resubmit the email system credentials.

If the technology finds a matching contact and the password matches, then the technology attempts to find a device associated with the contact having the computer's MAC address. If no such device is found, the technology creates a new device record and associates it with the identified contact. The submitting computer's MAC address is recorded in the new device record and a new unique ID is created and assigned to this device (a "device ID"). After the device record is created, the SkyKick engine returns authentication request success along with the device ID to the client service and includes information from the contact (e.g., a first name and information such as any new account credentials) and associated migration information (e.g., a scheduled migration date and time). The client service saves the validated credentials, device ID, and migration configuration data and informs the client UI, which may, e.g., advance to profile selection as described below.

If the user dismisses the client UI window without supplying a valid username and password pair, the client service will restart the client UI periodically until successful authentication has occurred. In some embodiments of the technology, the username and password are included in the client application installation package downloaded by the user, and upon initial execution, the username and password may be added to the client application's or user computer's data store.

In some embodiments of the technology, once successful authentication has been completed, the client service sends periodic requests to the SkyKick engine to obtain instructions for proceeding with particular actions. The SkyKick engine locates the associated device each time and evaluates the device information and the associated migration date to determine what instructions, if any, to return to the client service. When the client service is restarted and stored credentials are found, the client service resubmits those credentials and resumes periodically sending requests to the SkyKick engine to obtain instructions.

In some embodiments, after the technology creates a device record, the SkyKick engine sends the client service an instruction to perform a device inventory. When the client service receives this action, it collects and returns additional information about the user's computing device including, e.g., operating system version, processor "bitness", and email application version. The SkyKick engine uses the user's username, device ID, and MAC address to locate the appropriate contact and device record and adds the results of the inventory to the device record data.

Another instruction that the technology can send to the client service is a bandwidth measurement request. When the client service receives this action, it measures the time it takes to upload a known amount of data to a specific endpoint on the Internet to determine the available outbound bandwidth of the user's network and submits this measurement to the SkyKick engine. The SkyKick engine uses the user's username, device ID, and MAC address to locate the appropriate contact and device record and adds the results of the bandwidth measurement to the device record data.

In some embodiments, the client application begins profile selection by examining the mail information for the logged-in user and retrieving a list of profile names. If no profiles are present, a null selection is made by default and the block is complete. After determining that there are one or more profiles present, the client service examines the mail information and retrieves a list of the user computer's data store names associated with the first profile. If there is only one profile and one data store, the default selections of profile and data store suffice to make the selections without any user interaction. However, if there are multiple data stores or multiple profiles, the client UI may, e.g., display a profile and data store selection form. This form includes a method of choosing from the list of profiles such as dropdown selection boxes. If there is only one profile, that selection is implied. Given an implicit or explicit selection of a profile, the list of associated data stores is presented for selection. If the name of one of the data stores matches the email address of the user, this data store is made the default selection. If there is only one data store, this data store selection is implied. When the user indicates that profile/data store selections have been made the block is complete. If the client UI window is dismissed without a profile being selected, the client service will periodically restart the client UI until profile selection has occurred.

When profile and data store selection is complete (implicitly or explicitly), the client application saves the selections in a local data file, calculates the size of this data store, and reports the information to the client service. The client service submits a profile selection request to the SkyKick engine. The technology finds the associated device record and records the user's profile and data store selection names and the data store size. The SkyKick engine then returns a response indicating success. The client UI displays to the user the results of saving and reporting the profile selection.

Initial Sync

After the technology has received a user's credentials for a source email system from which the user's data is to be migrated, the SkyKick engine begins a process to perform a migration pass (an "initial sync"). The technology creates a mailbox on the destination email system and then performs an initial user email system migration.

In some embodiments of the technology, upon successful connection and login to a mailbox, a number of concurrent connections are established to the mail service. The number of concurrent connections may be limited to avoid exceeding an estimated bandwidth limitation, as described in further detail above. The folders of the mailbox are enumerated. For each folder, a concurrent operation is started to divide the folder's contents into batches of message identifiers. The technology retrieves message identifying attributes by queries to the source email system for message object metadata. Depending on availability of this metadata for each protocol type, metadata attributes queried may include, e.g.,: message system ID, created date, received date, message size, existence of an attachment, message subject, etc. For each batch, the technology starts a concurrent operation to retrieve message object content for each message identifier in the batch.

In some embodiments, Internet I/O is limited by the number of concurrent persistent protocol-specific TCP connections and by the number of threads available in the thread pools for folder and message item operations. Internet I/O may also be attenuated by use of thread communication and blocking techniques to throttle network calls when messages over a specified size threshold are encountered. The technology may be tuned to throttle to a maximum acceptable memory footprint for any set of messages from batches still in-memory given, e.g., the size of the server image the technology is running on.

Each message object is assigned an identifier ("ID") that is replicable and guaranteed to be unique within the source email system, e.g., a globally unique identifier (GUID). Each message object is then translated to an object type acceptable to the destination email system and sent to its analogous location in the destination email system. The assigned message ID is then stored in a cache (e.g., in memory and/or persisted to the system datastore) upon successful migration of a messaging object from source to destination email systems. Additionally, this assigned message ID is stored in the metadata of the message object itself on the destination email system, so as to be retrievable in the future.

In some embodiments, every Internet I/O call for the sync process is routed through an error tracking system to ensure fault tolerance. This system is seeded with a default number of retries and a set of error profiles that can be applied to specific exceptions that are anticipated to occur. The error profiles signal the system to make real-time changes to connection and/or message object state before retrying the Internet I/O call a number of times also signaled by the profile. The error profiles also dictate logging messages to an error tracking system. The error tracking system records error messages for each unfixable exception. The error tracking system also attempts to save source message object content that was available to the system in the case of, e.g., an exception that occurred after the content was successfully retrieved but before it was sent to or successfully saved on the destination email system. The error tracking system also provides a final report after each migration pass detailing a source email system snapshot, destination email system before and after snapshots, number of failed messages, counts of migration errors grouped by error message, and other metrics.

DNS Migration Automation

Figure 7:
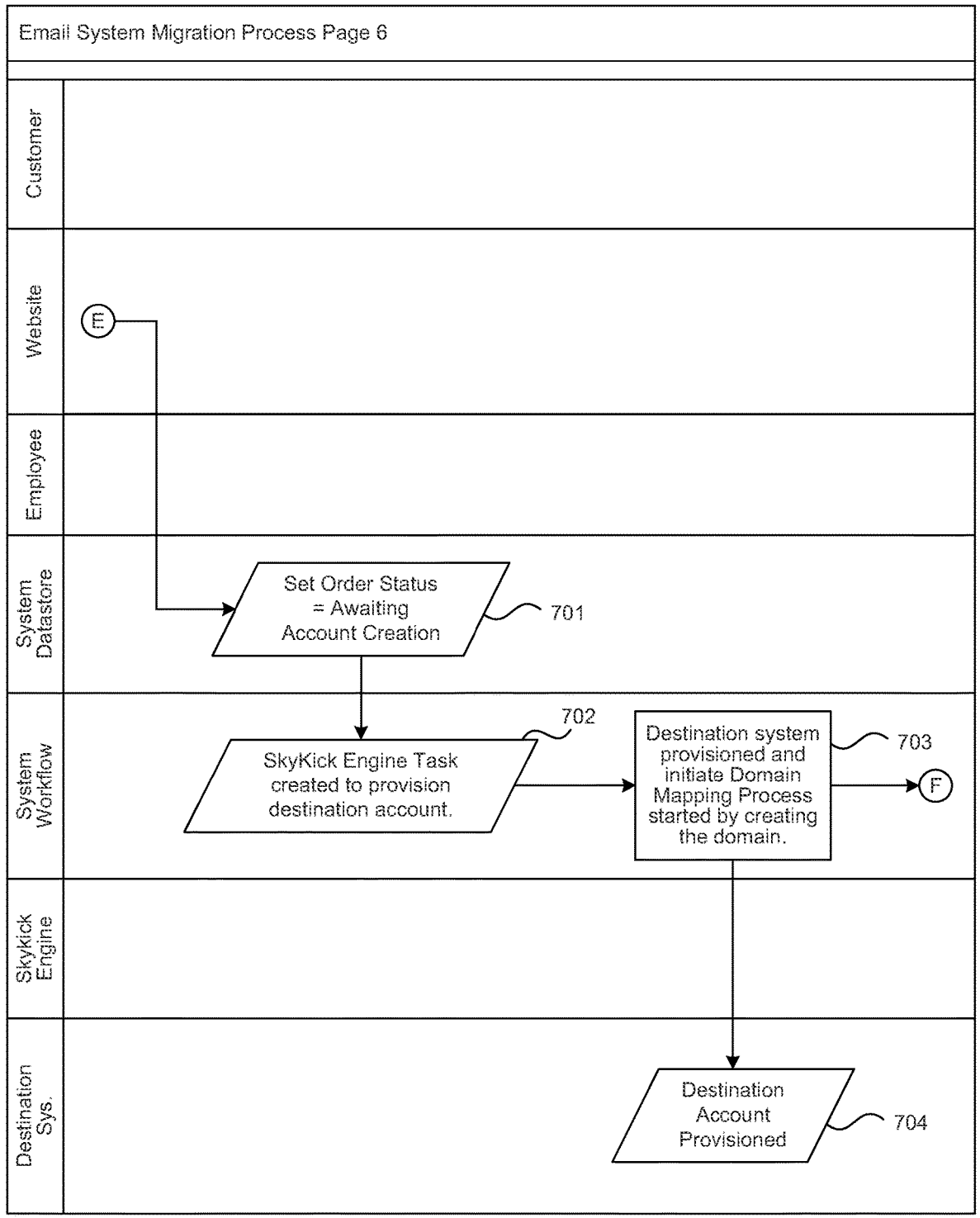
Figure 8:
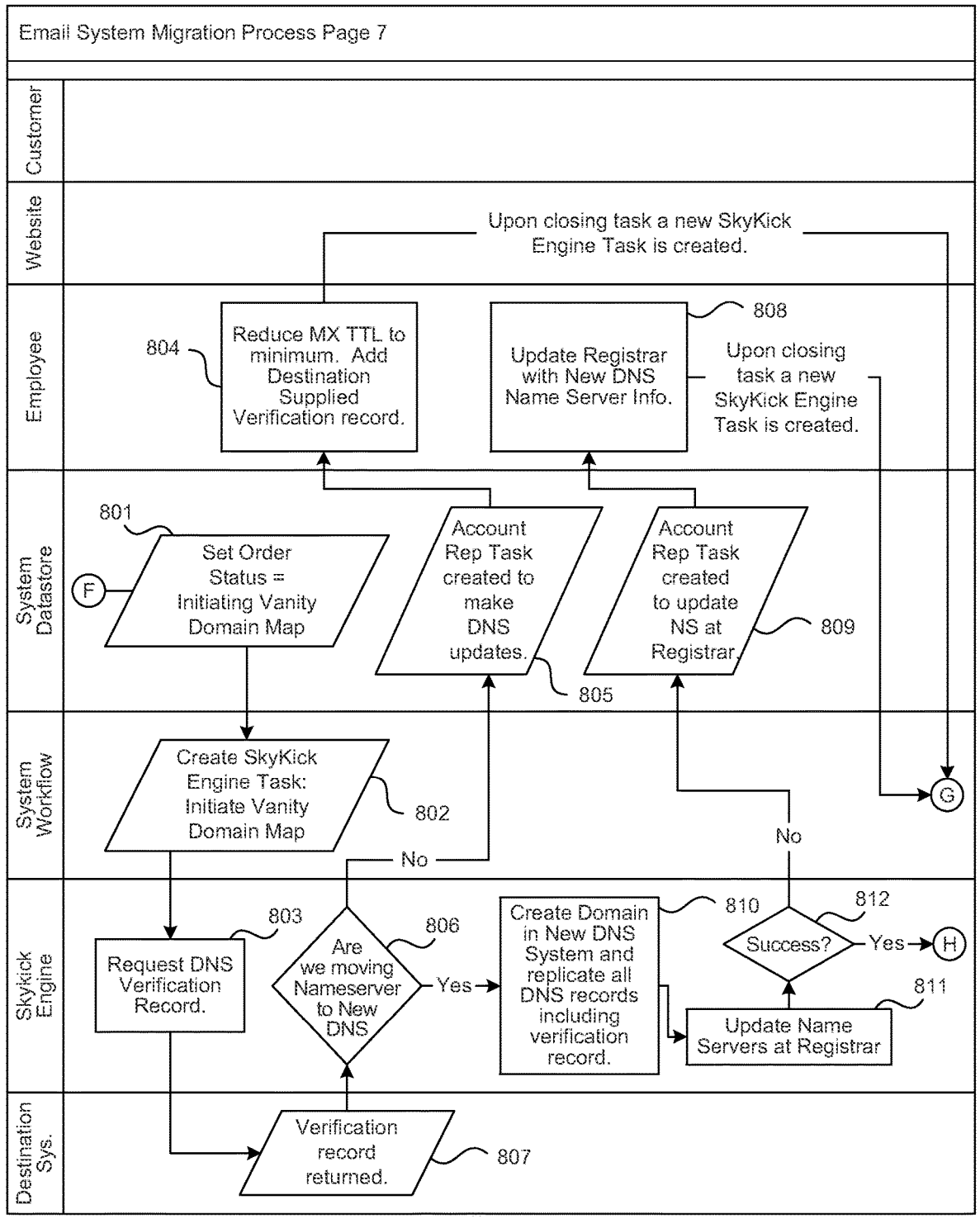

Referring now to FIGS. 7 and 8, after the customer's submittal of the migration order, the technology contacts the destination hosting service (e.g., through published APIs or via an Internet browser session) and, if no account exists, creates a destination account for the customer (FIG. 7, blocks 703 and 704). Once this account is created and any necessary licenses are purchased, the technology updates the migration status to indicate that the technology is initiating a domain mapping process (FIG. 8, blocks 801 and 802). The SkyKick engine requests a DNS verification record from the destination email system (blocks 803 and 807) and then can take various actions depending on, e.g., whether or not the customer has selected to move their DNS nameservers to a new DNS system managed by the company (block 806):

If the customer has selected to relocate their DNS nameservers, then the technology creates a new domain in the new DNS system and adds the existing DNS records from the current nameservers to the new DNS system as well as the domain verification record returned from the destination email system (block 810). The technology can accomplish this by making queries for, e.g., the following Internet class DNS records for the customer's domain(s) from the current DNS nameservers and then creating an exact copy of the returned record(s), if any are returned, in the new DNS system:

| | |
|---|---|
| A | |
| AAAA | |
| CNAME | email, imap, lyncdiscover, ftp, mail, pop, webmail, www, admin, administration, ads, adserver, alerts, alpha, ap, apache, app, apps, appserver, auth, autodiscover, backup, beta, blog, campus, cdn, chat, citrix, cms, console, corp, crs, cvs, database, db, demo, dev, devsql, dhcp, direct, dmz, dns, dns0, dns1, dns2, download, e, en, erp, eshop, exchange, f5, fileserver, firewall, forum, ftp0, git, gw, help, home, host, http, i, id, images, info, internal, internet, intranet, ipv6, lab, ldap, linux, local, log, m, mail2, mail3, mailgate, main, manage, mgmt, mirror, mobile, mobilemail, monitor, mssql, mta, mx, mx0, mx1, my, mysql, news, noc, ns, ns0, ns1, ns2, ns3, ns4, ntp, ops, oracle, owa, partner, partners, pbx, pda, portal, secure, server, shop, sip, smtp, sql, squid, ssh, ssl, stage, staging, stats, store, svn, syslog, test, testing, upload, vm, vnc, voip, vpn, whois, wiki, www2, www3, xml |
| MX | |
| SRV | _afpvertcp._tcp, _ssh._tcp, _autdiscver._tcp, _caldav._tcp, _client._smtp, _gc._tcp, _h323cs._tcp, _h323cs._udp, _h323ls._tcp, _h323ls._udp, _h323rs._tcp, _h323rs._tcp, _http._tcp, _iax.udp, _imap._tcp, _imaps._tcp, _jabber-client._tcp, _jabber._tcp, _kerbers-adm._tcp, _kerbers._tcp, _kerbers._tcp.dc._msdcs, _kerbers._udp, _kpasswd._tcp, _kpasswd._udp, _ldap._tcp, _ldap._tcp.dc._msdcs, _ldap._tcp.gc._msdcs, _ldap._tcp.pdc._msdcs, _msdcs, _mysqlsrv._tcp, _ntp._udp, _pp3._tcp, _pp3s._tcp, _sip._tcp, _sip._tls, _sip._udp, _sipfederatintls._tcp, _sipinternaltls._tcp, _sips._tcp, _smtp._tcp, _stun._tcp, _stun._udp, _tcp, _tls, _udp, _vlmcs._tcp, _vlmcs._udp, _wpad._tcp, _xmpp-client._tcp, _xmpp-server._tcp |
| TXT | |

In addition to the above queries and replication logic, the technology can determine whether there are any 'wildcard' DNS records. To determine whether there is a wildcard A or CNAME record in the DNS Zone, the technology creates a string of characters that is extremely unlikely to be a domain name label and performs a request for a matching A or CNAME record. If the request returns a successful result, and the result is not equal to the requested string, then the system determines that whatever the result contains is the value of a wildcard A or CNAME record.

In some embodiments, in addition to the queries and replication logic described above, the technology uses web automation technologies to connect to the customer's current nameserver hoster's website control panel, log in with the customer's credentials, find the domain in question and retrieve some or all of the DNS records displayed in the control panel. The records are merged into the new DNS system with the other identified DNS records.

Next, the technology may update the nameserver listing at the registrar with the correct fully qualified domain name of each of the newly created nameservers (block 811). If for any reason the updating of the nameserver listing at the registrar fails, then a task is created in the system datastore instructing a company employee to manually update the nameservers at the registrar (blocks 812, 809 and 808). If, however, the SkyKick engine is successful in updating the nameserver listing at the registrar, then the SkyKick engine task is closed (FIG. 9, block 903) and the technology updates the migration status to indicate that the technology is verifying the domain (FIG. 9, block 902).

2. If the customer has selected not to relocate their DNS nameservers, then a task is created in the system datastore instructing a company employee to manually add the verification record to the customer's nameservers and reduce the time-to-live (TTL) persistence of the customer's MX record(s) to the minimum possible value (blocks 806, 805 and 804).

Figure 9:
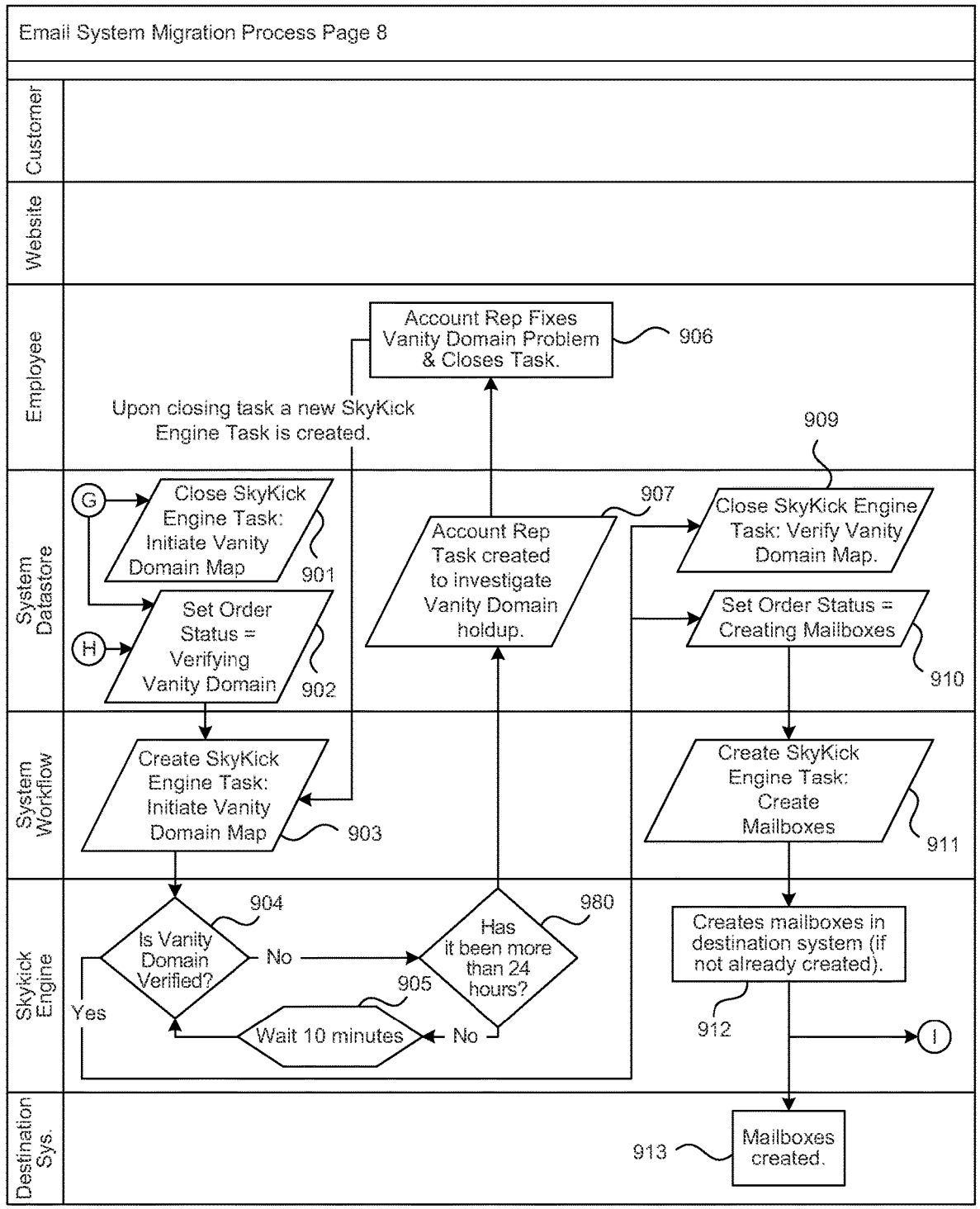

If in the above process a task is created instructing the employee to do any work (blocks 804 or 808), then when the employee closes the task the system workflow engine sets the migration status to indicate that the technology is verifying the domain (FIG. 9, block 902).

Referring now to FIG. 9, when the migration status is updated to indicate that the technology is verifying the domain (block 902), then the system workflow engine creates a new SkyKick engine task (block 903) that causes the SkyKick engine to verify the mapping of the customer's domain (block 904). If verification is successful, then the SkyKick engine task is closed (block 909) and the migration status is updated to indicate that the technology is creating mailboxes (block 910). If the domain is not verified, then the SkyKick engine responds in, e.g, one of the following ways:

If 24 hours, or any other determined interval of time, has not transpired since the migration status was set to verifying the mapping of the customer's domain, then the SkyKick engine waits for, e.g., ten minutes and then checks to see if the domain has verified (blocks 908, 905 and 904). The SkyKick engine continues this checking until 24 hours, or any other determined interval of time, has transpired since the migration status was set to verifying the domain.

If 24 hours, or any other determined interval of time, has transpired since the migration status was set to verifying the domain, then the SkyKick engine may create a task in the system datastore instructing a company employee to investigate why it is taking so long for the domain to verify (block 907). This in turn may cause the employee to investigate and fix the domain verification problem (block 906), and when complete, the employee closes the task which in turn causes the system workflow engine to create a new SkyKick engine task to verify the domain (block 903).

Figure 10:
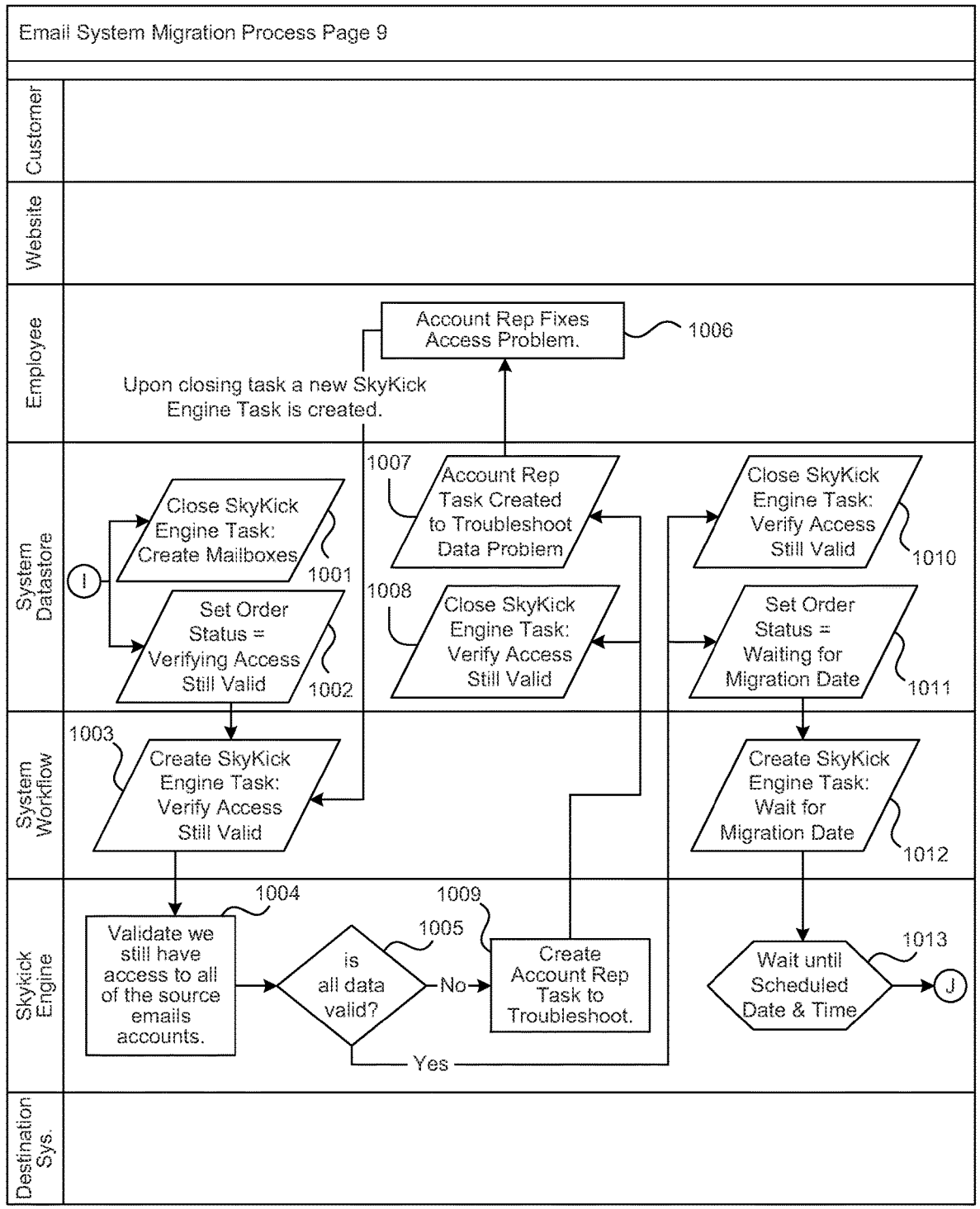

When the migration status is updated to indicate that the technology is creating mailboxes (block 910), the system workflow engine creates a SkyKick engine task (block 911) which in turn causes the SkyKick engine to connect to the destination email system and create the mailboxes (blocks 912 and 913) and then close the SkyKick engine task (FIG. 10, block 1001) and update the migration status to verifying that access is still valid (FIG. 10, block 1002).

Continuing in FIG. 10, the system workflow engine may create a new SkyKick engine task to verify that access is still valid (block 1003), which in turn may cause the SkyKick engine to validate that the system still has all the necessary access to the source computer and email system (block 1004). If all the data is still valid (block 1005), then the SkyKick engine task is closed (block 1010) and the migration status may be updated to, e.g., indicate that the technology is waiting for the migration date (block 1011). If all of the data is not valid (block 1005), then the SkyKick engine closes the SkyKick engine task (block 1008) and may create a task instructing a company employee to troubleshoot the invalid source email system credentials (block 1009 and 1007). Once the employee fixes the access problems and closes the task (block 1006), the system workflow engine creates a SkyKick engine task to again attempt to verify that access is valid (block 1003).

When the migration status is updated to a state of waiting for the migration date (block 1011), the system workflow engine can create a new SkyKick engine task (block 1012) to cause the SkyKick engine to go into a wait mode until the scheduled migration date and time (block 1013).

Figure 11:
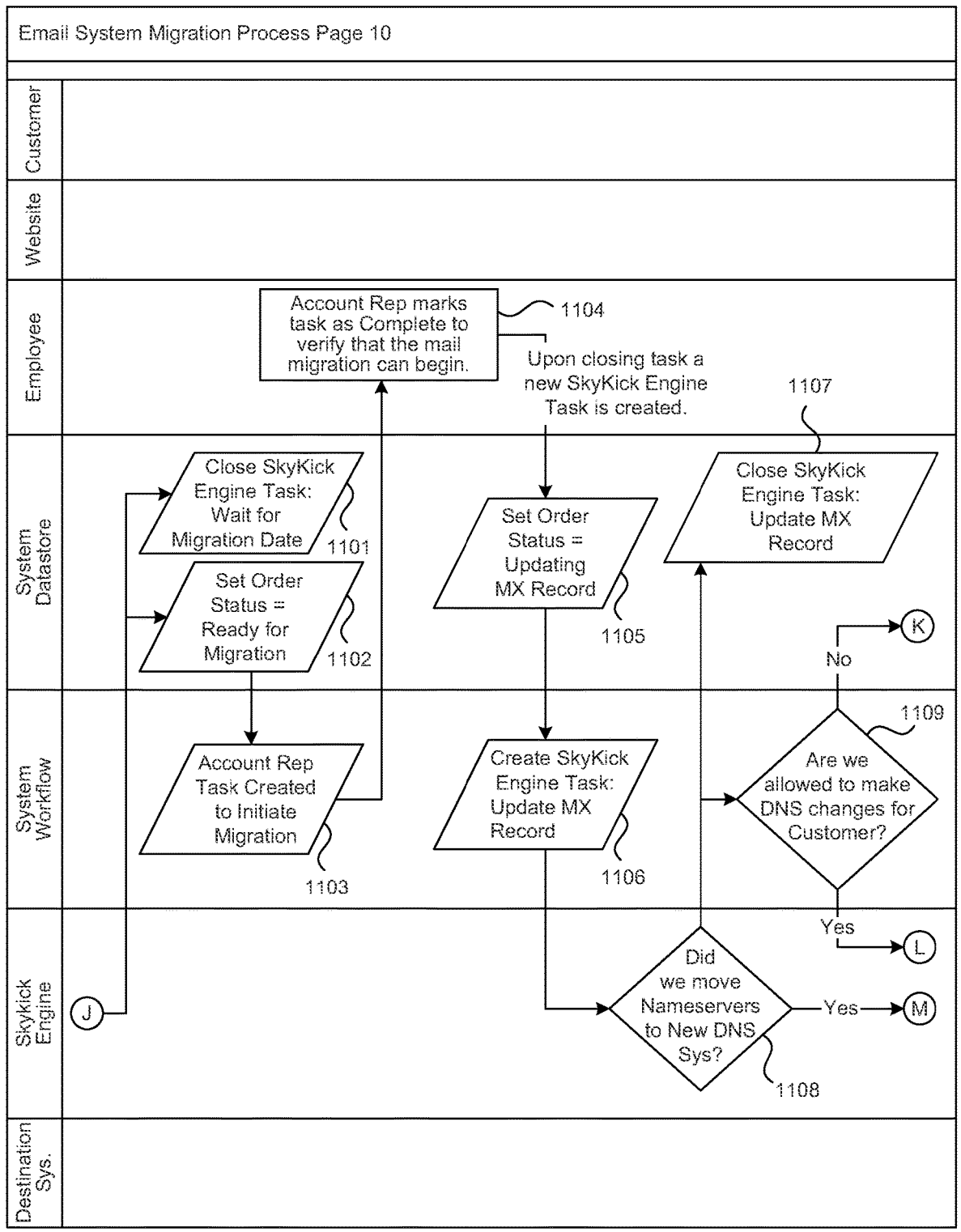
Figure 12:
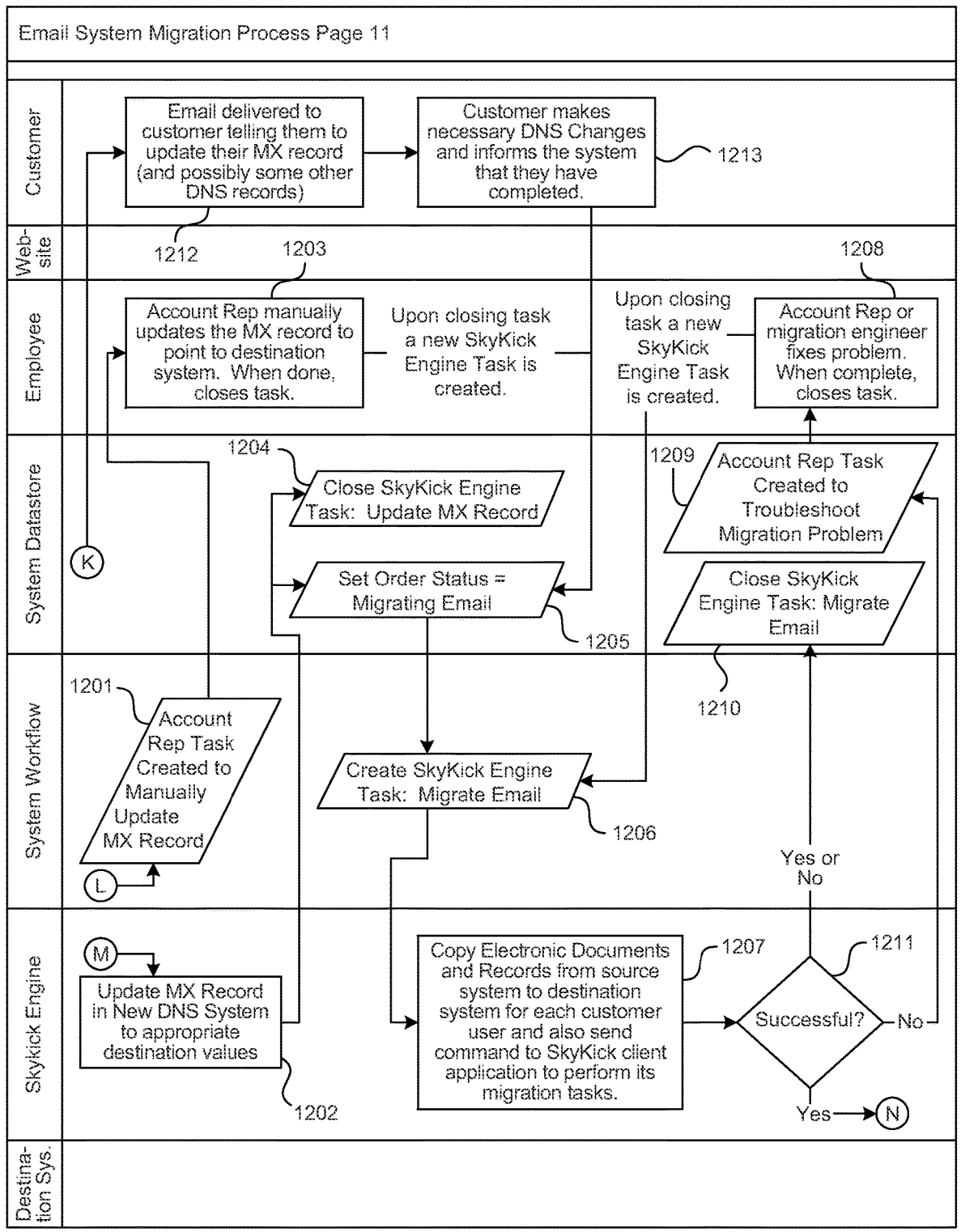

Referring now to FIG. 11, when the migration date and time arrives, the SkyKick engine closes the SkyKick engine task (block 1101) and updates the migration status to show that the technology is ready for migration (block 1102). When the migration status indicates that the technology is ready for migration, the system workflow engine may create a task for a company employee to confirm that the migration should begin (block 1103). Once the employee confirms that the migration should begin by closing the task (block 1104), or if the system does not require employee approval, the migration status is updated to indicate that the technology is updating the customer's MX record or records (block 1105). The system workflow engine creates a SkyKick engine task (block 1106), and the SkyKick engine responds in, e.g, one of the following ways:

If the nameservers were not moved to the new DNS system (block 1108), then the SkyKick engine closes the SkyKick engine task (block 1107) and creates a task instructing the employee to manually update the MX record (FIG. 12, block 1201). The employee connects to the customer's nameserver and updates the MX record to the appropriate value (block 1203). When the employee closes the task the migration status is updated to indicate that the technology is migrating email system data (block 1205).

If the nameservers were moved to the new DNS system (block 1108), then the SkyKick engine connects to the new DNS system and updates the MX record (FIG. 12, block 1202), closes the SkyKick engine task (FIG. 12, block 1204) and updates the migration status to indicate that the technology is migrating email system data (block 1205).

When the migration status indicates that the technology is migrating email system data (block 1205), the system workflow engine creates a new SkyKick engine task (block 1206) and the technology creates a SkyKick engine task to perform an additional migration pass (a "final sync") for each migration contact associated with the migration order. This causes the SkyKick engine to copy electronic documents and records from the source email system to the destination email system for customer users (block 1207).

Final Sync

The technology performs a final sync migration pass that is similar to the initial sync pass described above. Differences between a final sync and the initial sync may include, e.g., the following: 1) as a source email system message identifier is created for each message in a batch, that identifier is checked against the cache of identifiers created in the initial sync pass. If the identifier exists in the cache, indicating that a message object has already been migrated, the message object is marked to skip the actual transfer step (thus avoiding a duplicate item being created on the destination); and 2) as the source message object metadata is collected, current message state information (e.g., flags for read/unread, starred, draft) is stored in an in-memory data structure.

The technology verifies that that the final sync was successful (e.g., verifying that the number of exceptions encountered was below a preset number and that the migrated data passes a series of source-destination reconciliation checks). If the pass is valid, any migration object IDs that were not encountered on this migration pass are assumed to have been deleted from the source email system between the time of the initial sync and the final sync and are thus marked for deletion on the destination email system. A scan of the destination email system message headers is then performed (as described above in connection with the mailbox discovery process) and the state of changed message state information is updated to reflect the most recent state of the source email system. The technology returns the destination email system migration IDs (e.g., message IDs) of any message objects that were marked for deletion. Using those destination email system IDs, the technology sends the destination email system concurrent requests to delete each of the messages marked for deletion.

Figure 13:
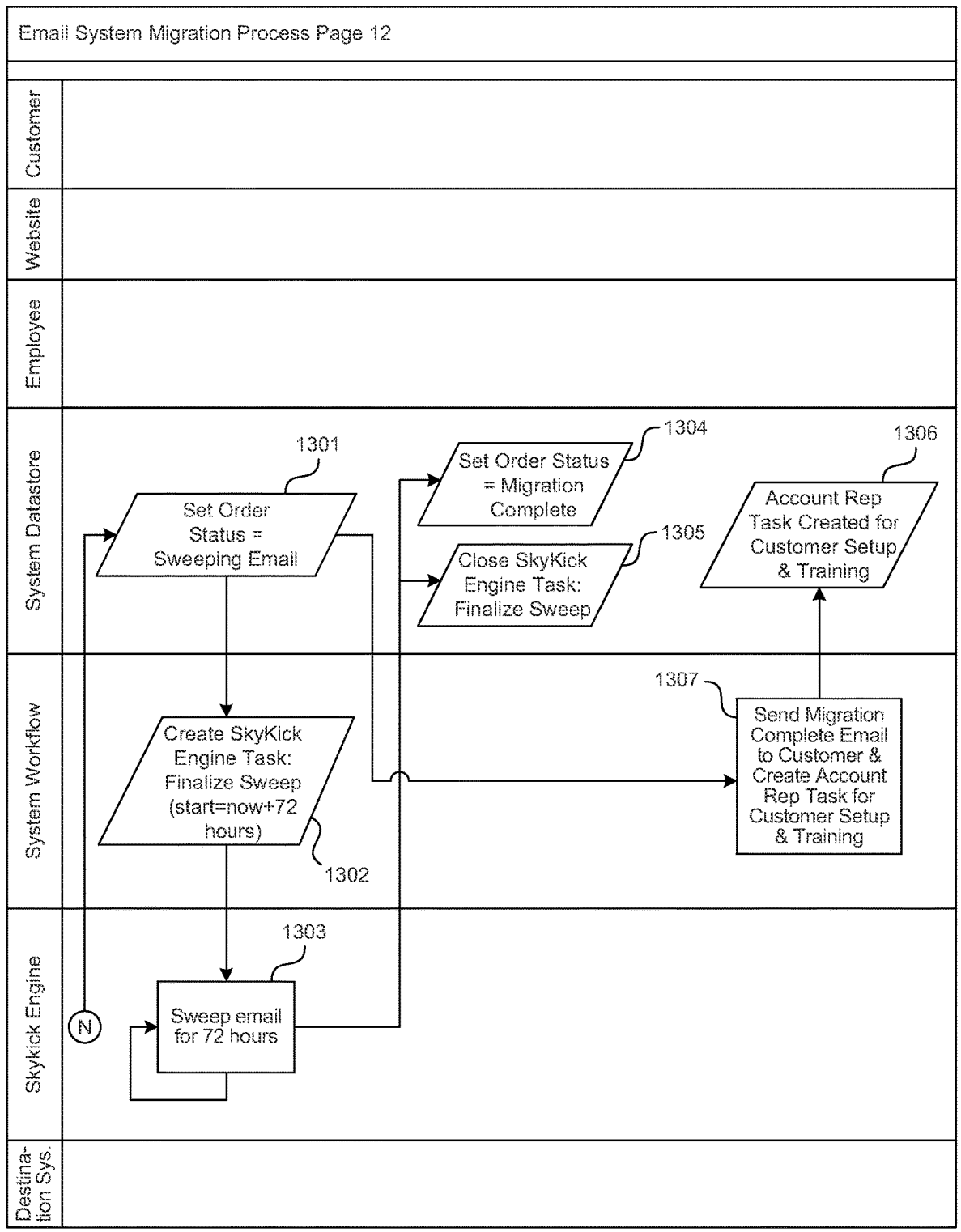

Once the SkyKick engine completes the copying of electronic documents and records it makes a determination of whether or not the migration was successful (block 1211). This determination is based on the tracking of successfully copied items, unsuccessfully copied items and the total number of items in the source email system. If the percent of unsuccessfully copied items is less than a pre-determined threshold (e.g., 1%), then the migration is considered successful and the SkyKick engine closes the SkyKick engine task (block 1210) and updates the migration status to indicate that the technology is ready to periodically sweep incoming email (FIG. 13, block 1301). If the percent of unsuccessfully copied items is greater than a pre-determined threshold, then the migration is considered unsuccessful and the SkyKick engine closes the SkyKick engine task (block 1210) and then creates a task instructing the employee to troubleshoot the migration errors (block 1209). After troubleshooting the migration errors and closing the task (block 1208), the system workflow engine creates a new SkyKick engine task to migrate email system data (block 1206).

Client Application User Migration

In some embodiments of the technology, for any device for which the client application setup has been completed as described above (e.g., the client application installed, the user's credentials authenticated, and the user's profile/data store selection(s) reported), when the client service is executing, it will periodically request instructions from (i.e., poll) the SkyKick engine. Upon receiving and processing such a request (e.g., before the migration date), the SkyKick engine examines the device record and determines that the client application setup is complete. As a result, it updates a status to indicate that the device is ready to start a profile creation process. In response to a subsequent request for instructions from the client service running on that device, the technology returns an instruction to the client service to set up the user's email application profile for migration, and updates a record of the device's state. Additional instructions that can be returned by the SkyKick engine to the client service include actions to create a profile, delete a profile, and set a migration date and/or time.

The client application proceeds to configure the user's email application to send messages and to synchronize contents with the migration destination email system server(s) over the Internet. Configuration typically involves creating an email profile (a "destination profile"), unless such a profile is already present (e.g., having been previously created either manually or by a prior execution of the client service). The instruction issued by the SkyKick engine to set up a destination profile includes a specific name for the destination profile. When the client service receives such an instruction to configure a destination profile, the client service checks to see if the client UI is active and, if not, starts client UI execution. The client service issues a command to the client UI via inter-process communication with the command name and destination profile name. The client application establishes an API session with the user's email application, obtains a list of existing profiles, and looks for any that are named with the destination profile name. If any are so named, successful completion is reported to the client service, which in turn reports successful completion to the SkyKick engine.

If a destination profile is not present, the client application begins to configure a new destination profile. In some embodiments, all of the information for the configuration is supplied together with the instruction. In some embodiments, the client application obtains additional required information, e.g., by using an automatic discovery process to locate the email server information necessary to create the profile. Once all the required information is available, the client application makes an API request to create a new profile with the destination profile name and configuration information. If the user's email application requires authentication credentials to be entered through the user interface to complete the request to create and/or configure a new profile, the client application launches a user interface automation thread that automatically detects and fills in a sign-in form with the associated username and password. The thread is terminated once the profile creation process has been completed. If the profile creation succeeds, the client service returns a success status to the SkyKick engine, which updates the progress state in the associated device record.

If either the client UI or the client service encounters an error in fulfilling the client profile configuration action, the client service returns a failure status to the SkyKick engine, which records the error state in the associated device record. That status may be reset to a "ready to start" state either by a manual change by a technician or by automatic repair and retry logic. A result of changing the state back to "ready to start" is that the instruction to set up the user's email application profile for migration will be returned to the client service upon a subsequent poll from the user device.

If the technology determines that the user's email application setup has been completed, then the technology identifies the next step as migration. Once the migration date and time have arrived, the SkyKick engine returns an instruction to the client service to migrate the email application data and updates the state of each migration element. The client application proceeds to copy data and settings from the user's email application source data store into the destination profile's default data store. The migrate instruction issued by the SkyKick engine includes a list of scopes (e.g., email data, calendar data, contact, data, task data, notes, rules, etc.) reflecting device migration scope items that are in the active migration process.

When the client service receives an instruction to migrate, the client service checks to see if the client UI is active and, if not, starts client UI execution. In some embodiments, the client service sets the migration date and time to the current date and time. Whenever running, the client application checks to see if the migration date has been reached. When it finds that it has, the client application begins a sequence of steps to complete the configuration of a new profile. The client application first makes an API request to change the default email profile to the destination profile name. The client application then determines if the email application process is running and, if so, stops (or kills) the process. The client application subsequently reopens the email application in the new profile. If for any reason, the e-mail application does not stop, the client UI displays a message for the user to close the application and waits a reasonable period of time for that to occur.

Once the email application has been reopened, the migration action continues in one or more of a variety of paths depending on the source profile and store. The client application first determines whether there is source data to migrate. If there is no data store, the migration is considered complete immediately and success if reported to the technology and recorded in the device record as completed on each applicable scope.

If there is no local data to transfer, the client application skips past the data transfer step. If it is determined that there is source data to transfer, the client application opens the source data store and scans it to count the number of folders and messages in that store. The client application then opens the destination default data store and scans it to count the existing number of folders and messages in that store. The statistics for both source and destination stores is then reported to the SkyKick engine where it is recorded in the associated device record.

If the source contains local data to be migrated, the client application traverses the source data store folder hierarchy to find any folders that are of a type included in the migration scopes. If a folder is included, the client application determines whether the folder already exists in the destination store. If not, the client application creates the folder in the destination store. After that, a pass is made to compare each item in the source folder with items in the destination folder by, e.g., a combination of all the header values and body content. Those items that are not present in the destination are then copied to the respective destination folder. This is repeated for all subfolders within each source folder until all items are present in the destination store.

In some embodiments, additional filters may be included in the migration action instructions based on settings on either the migration order or the device record (in case of a conflict, the technology may prioritize, e.g., the device settings to override the migration order settings). Examples of such filters include, e.g., a maximum transfer size limit, a message receipt cutoff date by which messages will be copied to the destination only if received before that date, and an appointment age cutoff date by which appointments will be filtered to include only those non-recurring appointments after the given date (recurring appointments may be included regardless of date because of the complexity of determining whether they recur at a compliant date). Scope, date and size limits reduce the amount of data copied to the destination store. Items in scope that are not copied to the destination due to a date or size filter may be copied to a newly created archive data store that is attached to the destination email system profile so that the archive is accessible to the user from the destination email system profile.

In some embodiments of the technology, if a maximum overall size for migration has been specified, the client application determines whether the total size of the source items (within scope and date criteria) exceeds this maximum size. If not, the entire set of source items is copied to the destination. Otherwise the technology may prioritize data to be migrated. For example, if the entire set of source items exceeds the maximum limit, but the Inbox and Sent Items and their folders are less than the maximum, then only the Inbox and Sent Items are copied to the destination. If the entire Inbox and Sent Items will not fit, the client application copies items from the Inbox and Sent Items until the size limit is reached. Items in scope that are not copied to the destination are copied to a newly created archive data store that is attached so that the archive is accessible to the user from the destination email system profile.

After the local source data has been copied to the destination store, the destination store is scanned again and the statistics reported to the SkyKick engine, where it can be determined to what extent the data migration succeeded. In addition, the technology copies custom settings from the source profile in the email application to the destination profile. Such settings may include, for example, default signature selections, categories, junk mail settings, out-of-office settings, quick steps, an autocompletion dictionary, etc. A migration scope for "rules" or "categories" may be included with folder type scopes in a migration action or may be issued as a separate migration action. If the latter, the client application uses the API to extract custom rules from the source and inserts those rules into the destination.

The migration identifies any data stores attached to the source profile other than the selected store that was migrated. These data stores are attached to the new profile so that the items in these stores are available to the user when using the email application opened with the new profile.

Because the user's email application may present sign-in and other dialogs through the user interface to complete the migration actions, the client application launches a User Interface Automation thread that automatically detects and fills in a sign-in form with the associated username and password as well as dispenses with other dialogs emanating from the email application. This thread is terminated once the migration process has been completed.

If the migration executes to completion, the client service returns a success status to the SkyKick engine which updates the status of each migration step on the associated device to a "completed" state. If at any point the client UI or the client service encounters an error in fulfilling the migration actions that interferes with completion of the process, the client service returns a failure status to the SkyKick engine that sets the state of applicable migration scope items on the associated device record to an error state. The state(s) may be reset to a ready to start migration state either by a manual change by a technician or by automatic repair and retry logic. The result of changing the state(s) back to "ready to start" is that the instruction(s) to begin migration will be returned to the client service upon a subsequent poll from the user device.

In some embodiments of the technology, during a migration, the client UI displays information about tasks taking place, which may include a progress bar that shows one or more task completion percentages. If the client UI is closed by the user while any action including migration is in process, the migration process will continue as long as the computer is running. However, if the computer is shut down, the action will be processed and begin again when the computer is restarted. The client service may continue polling the technology for instructions during various actions. Among the actions that can be issued by the technology are, e.g., commands to suspend migration and resume migration.

Once the local data migration has been completed, the client UI can be closed by the user at will. If subsequent actions are issued by the technology, the client service will determine whether the client UI needs to be started. Among possible actions are a repeat of previous actions as well as optional actions. For example, an action to display a message to the user can be issued by which the client UI will display the supplied message in either a notification window or in a traditional application window based on the command parameters. An action to upgrade the client application software will cause the client application to download the new upgrade package and offer to run the upgrade (or alternatively to instruct the user to run it). An uninstall action can be issued to have the client application disable and uninstall itself.

Alternative Migration Mechanics

In some embodiments of the technology, the client application performs a local data copying operation on the user device to accomplish remote data migration. For example, when transferring items from a local data file to a new cloud or server-based destination email system account, the client application extracts each item to be migrated from the source data store on the device through an email application API and adds them to the destination local email store via the same API. Those items (which may be email messages, IM, appointments and other calendar items, tasks, notes, contacts, or other records managed and stored by an email application) are then copied to the destination email server's storage by the user's email application through a process (often referred to as "synchronization") that is not controlled by the client application.

When transferring items from a local data file to a new cloud or server-based destination email system account, it may be preferable in some situations to bypass the local store when inserting the items into the destination account.

In some embodiments of the technology, instead of the client application inserting data into a local data store, a migration agent executing on a server (e.g., in the cloud) inserts messages into the destination account. For example, the client application extracts the items from the local store and transfers them to the cloud or server-based migration agent for insertion. In some embodiments, the client application locates the data file (mail store) and transfers it to the migration agent, which extracts all or selected items from the data file according to migration order filters. The extraction may be either by directly reading the file and parsing it for metadata and content, or by simulating the user's email environment and using a compatible email application API. Once items have been extracted, the migration agent may use any method supported by the destination email account to add or insert the messages (e.g. Exchange Web Services for Office 365).

The client application communicates with the migration agent over a web service interface or other data transfer connection and may use an intermediate storage location or queue to "hand off" the data. Both the client application and the migration agent communicate with a migration management system as well. The migration management system instructs the client application when to transfer data based on bandwidth availability so as not to monopolize the data link from the customer's business premises. Once all desired items from the source account are present in the destination account, an email application on any of a user's devices can access (or "synchronize") all or some items to that device.

Such an embodiment of the technology is potentially beneficial, for example, in the case where the device does not have sufficient storage space for both the original data file and a new data file containing copies of the items. It may also be beneficial when the email API is unable to insert messages into a new local email store due to errors that may occur due to corruption of the data store or for other uncontrolled reasons. Such an embodiment may be used for migrating a customer that will be primarily accessing the customer's destination email system account via a Web-based interface (e.g. Outlook Web Access) or through the use of email tools on devices other than the source device (e.g., when the existing mail client is incompatible with the destination email system account, or when a smart phone or other mobile device will be a primary tool for accessing the destination email system account).

In some embodiments, the migration takes place at the migration date (when the MX records have been switched) so that only a single migration pass is performed after the client application has been associated with the new account profile. This approach can be effective if no more mail will be downloaded to the client application and no more items will be added by the user once the source account is no longer accessed. It therefore requires that all users migrate at more-or-less the same time, e.g., in a single night. If there are large amounts of mail to copy, this can take many hours to make the local copies and even more hours to synchronize the items to the destination cloud account storage. If a failure occurs partway through the process, determining which items have been successfully copied to the destination may require an item-by-item comparison.

In some embodiments, the technology begins initial migrations for some or all users several days prior to the migration date. Changes may thus take place to the local data file after the initial migration; e.g., new items added, items deleted, and flags changed. Because of this, a subsequent reconciliation pass is required at the time of the switch. This multistep migration can be implemented using one of several approaches:

A first approach is to use a source/destination migrated item reference index table. The client application maintains a data table of both source and destination data store reference indexes, the date and time, and the source and destination folder path for each item copied to the destination. During a migration pass, each item in the source for which a source reference index is not present in the data table is copied to the destination. Those source item indexes in the data table for which the items are no longer found in the source (i.e., items that have since been deleted locally) are deleted from the destination using the destination data store reference index.

A second approach is checking last modified timestamps. The source email application maintains a last modified timestamp on each item (e.g., for content, folder location, and metadata alterations). During any migration pass, in addition to additions and deletions, the client application re-copies and resets metadata for each item whose last modified time is more recent than the last migration to the destination. In addition, if a source item is in a different folder than recorded in the data table, the item is either moved in the destination or deleted and recreated in the correct location. This includes the movement of items that are in the source email system's "Deleted Items" folder.

A third approach is to use a copied item identification hash. The client application creates an M-bit hash for each item in the source, which is saved along with a destination reference in a data table for each item copied to the destination. The hash is based on, e.g., the item folder path, flags, metadata, file length, and the first N bytes of content. M and N are both defined so that the hash may be assumed to be a unique identifier for each item and its source state. During each migration pass, the client application traverses the entire source item set, determines the hash for the item, and if it is already in the data table, updates the table to show that item is still present in the source in the previously copied state. If it is not found in the data table, the client application will copy that item to the destination and add that entry to the data table. Any item previously copied but not still present in the source in its previously copied state is removed from the destination using the reference associated with that entry in the data table.

In some embodiments, the technology migrates data from a source email system to a destination email system by dividing source email system data into batches of item identifiers; retrieving item metadata from the source email system; for each batch of item identifiers, retrieving all item content for each item identifier in the batch; and for each item in a batch to be transferred, assigning a unique item ID to the item, translating the item to an item type compatible with the destination email system, copying the translated item to the destination email system, and saving the assigned unique item ID in the item metadata on the destination email system. In some embodiments the technology further receives an indication to limit the scope of data to be migrated; determines whether an item is within the indicated scope of data; and copies the item to the destination email system only if the item is determined to be within the indicated scope of data. Copying an item to the destination email system may include, e.g., copying the item from a first data store on a client computing device to a second data store on the client computing device, and configuring an email application on the client device to synchronize the second data store with the destination email system. It may also include, e.g., copying a data store on a client computing device to a destination email system server for processing by a migration agent on the destination email system server. It may also include, e.g., processing a data store copied from a client computing device to a destination email system server, which may involve, e.g., directly reading the data store and parsing it for metadata and content, or simulating the email environment of the client computing device and using a compatible email application API to extract the item.

The process of migrating data from a source email system to a destination email system may further include performing multiple migration passes; for each pass, determining, for each item, whether identical items exist on the source email system and the destination email system; and for each item for which it is determined that identical items do not exist on the source email system and the destination email system, resolving the inconsistency by updating the destination email system. Determining, for each item, whether identical items exist on the source email system and the destination email system may include, e.g., referencing a data structure that maps a unique ID to every item copied to the destination. It may also include, e.g., identifying an item with a last modified time more recent than the last migration to the destination email system, so that resolving the inconsistency for an item with a last modified time more recent than the last migration to the destination includes re-copying and resetting metadata for the item. For a moved item, resetting metadata for the item may include modifying the path to the item in the destination email system, or deleting the item from the previous location and recreating the item in the moved location.

Sweep

Referring now to FIG. 13, when the migration status is updated to indicate that the technology is ready to periodically sweep incoming email (block 1301), the system workflow engine creates a SkyKick engine task (block 1302), sends an email to the customer stating that the migration is complete (block 1307), and creates a task for a company employee to help get the customer set up and trained on the destination email system (blocks 1307 and 1306).

When the SkyKick engine task to sweep incoming mail system items is created (block 1302), the SkyKick engine goes into a sweeping mode for, e.g., 72 hours, or any other specified time period. In the sweeping mode, every, e.g., ten minutes, or at any other specified time interval, the SkyKick engine connects to the source email system and copies any newly arrived emails or other new email system items over to the destination email system.

At each interval, the technology performs an additional migration pass (a "sweep") that is similar to the final sync pass described above. Differences between each sweep and the final sync may include, e.g., the following: 1) as a source email system message identifier is created for each message in a batch, that identifier is checked against the cache of identifiers created in the initial sync or final sync pass. If the identifier exists in the cache, indicating that a message object has already been migrated, the message object is marked to skip the actual transfer step (thus avoiding a duplicate item being created on the destination); and 2) a cutoff date is determined based on the last recorded migration pass (e.g., from the final sync or a prior sweep). When querying message object metadata for batch assembly, the technology limits queries to messages that are later than the cutoff date.

Once 72 hours (or another specified time period) have elapsed, the SkyKick engine closes the SkyKick engine task (block 1305) and updates the migration status to indicate that the migration is complete (block 1304).

Illustrative Technology Subsystems

Figure 14:
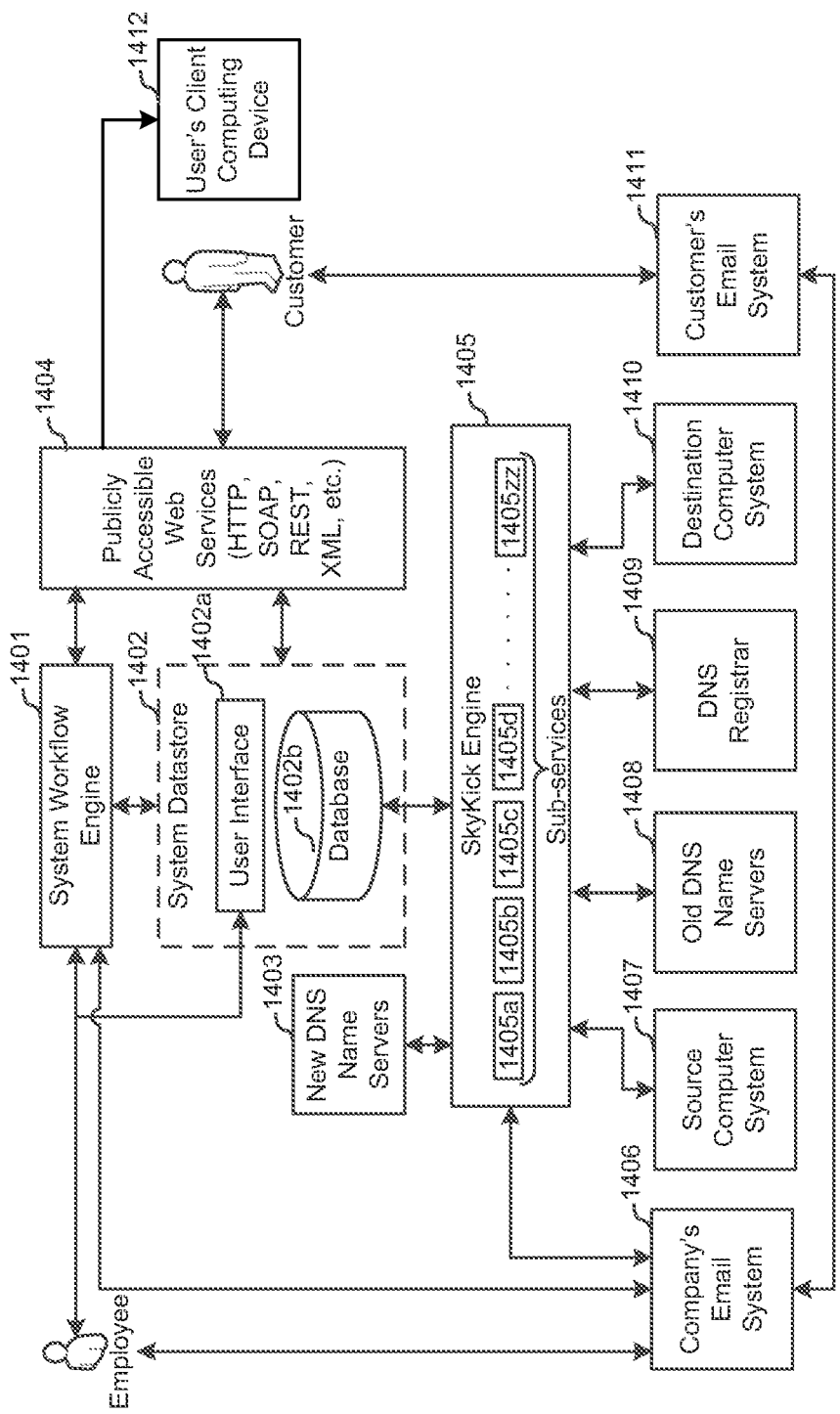
FIG. 14 is a block diagram illustrating computer systems and components arranged in accordance with some embodiments of the present disclosure.

Referring now to FIG. 14, in some embodiments, the technology can be implemented through the development of, e.g., five illustrative subsystems: a system workflow engine, a system datastore, a new DNS nameserver, a website, and a SkyKick engine (blocks 1401, 1402, 1403, 1404 and 1405, respectively) and communication with, e.g., six illustrative external systems: a company email system, a source computer system, a current DNS nameserver, a DNS registrar, a destination computer system, and a customer email system (blocks 1406, 1407, 1408, 1409, 1410 and 1411, respectively).

Block 1401 is the system workflow engine. This subsystem is responsible for scheduling tasks to be performed by either a company employee or the SkyKick engine subsystem (block 1405). The system workflow engine uses the storage capabilities in the system datastore's (block 1402) database (block 1402b) to store instructions for the employee or SkyKick engine. These instructions are in turn read and processed by either the employee or the SkyKick engine.

Block 1404 is the company's website, which is built to interact with the customer. The website has direct communication with the system workflow engine (block 1401) so that it can schedule tasks to be completed by either the employee or the SkyKick engine. The website has direct connectivity with the system datastore (block 1402) so that it can read and write information about the customer (e.g. contact information, selected order information, desired migration date, employee names and email addresses, billing information, etc.).

Block 1403 is the new DNS nameserver. This new nameserver is controlled by the SkyKick engine, creating new nameserver records and deleting and updating nameserver records when appropriate.

Block 1402 is the system datastore. It includes two subcomponents, a user interface (block 1402a) and a database (block 1402b). The system datastore user interface is used by a company employee to view and interact with tasks that are assigned to him or her. The system datastore database is used to store persistent data related to the technology as well as employee tasks and SkyKick engine tasks that are created by one of the other subcomponents of the technology and in turn read by one or more of the other subcomponents.

Block 1405 is the SkyKick engine, which in the illustrated embodiment is in turn comprised of a flexible number of sub-services (blocks 1405a through 1405zz). As a whole, the SkyKick engine is an asynchronous process which performs the instructed type of work over a longer period of time than is typically acceptable with a user interface and then provides results back to the subcomponents of the technology through, e.g., one or more of an email to the customer via the company's email system (block 1406), an update of the migration status in the system datastore, the creation of another SkyKick engine task in the system datastore, or the creation of an account rep task in the system datastore Since the SkyKick engine performs work which may take several seconds to several minutes, or longer, to complete, and the system as a whole has been designed to handle a large amount of volume, the SkyKick engine may be built as a collection of sub-services (blocks 1405a through 1405zz) that actually perform the work. The number of sub-services can be either static or non-static and can be all executing on a single computer system or distributed across multiple computer systems.

Blocks 1406, 1407, 1408, 1409, 1410 and 1411 illustrate six external systems that the technology may interact or integrate with.

The company's email system (block 1406) is used to send and receive electronic mail messages needed as part of the process. The company's email system is accessible by a company employee and may be used to communicate with the customer's email system (block 1411).

The source computer system (block 1407) is a computer system housing source email system data (e.g., electronic mail, electronic contacts, electronic calendar appointments and any other type of electronic document or file) that the technology migrates to the destination computer system (block 1410).

The current DNS nameservers (block 1408) are queried by the SkyKick engine to read the values of the customer's DNS records prior to beginning the migration.

The DNS registrar (block 1409) stores records identifying the customer's DNS nameservers and is updated by the SkyKick engine during the migration.

Illustrative Website Pages

Figure 15:
FIG. 15 is a display diagram illustrating a window with basic customer information requests.

FIGS. 15-22 are display diagrams illustrating screens that may be shown in various embodiments of the technology. FIG. 15 is a display diagram illustrating a window with basic customer information requests. The customer is asked three questions to get started: their business email address, the number of employees in the company, and a desired migration date. When the GO button is clicked the customer progresses to FIG. 16.

FIG. 16 is a display diagram illustrating a screen requesting customer contact information and administrative credentials. The customer is asked for several items of information (block 1601), including, e.g., the website user's name, email address, phone number, preference for being contacted, an alternate contact's name, email address and phone number, and the desired migration date and time.

Next on the page are identification of the customer's email hoster (block 1602) and the customer's email registrar (block 1603). These two blocks are determined, e.g., by a background process while the user is completing the elements in block 1601. After the values are determined by the background process, they are rendered on the web page for the user to see. The email hoster and email registrar values are determined as described above in connection with FIG. 2.

In the illustrated embodiment, once the email hoster and email registrar values have been determined, then the last three blocks on the web page (blocks 1604, 1605 and 1606) are made visible (they may initially not be visible) and the website user is required to provide the information asked for in blocks 1604 and 1605. Once complete, the user clicks on the Submit button (block 1606).

When the Submit button (block 1606) is clicked, the web server uses the information provided in blocks 1604 and 1605 to attempt to authenticate with the email hoster and email registrar. If this authentication fails for either of these, then an error message stating which system the server failed to authenticate with may be displayed and the user may be required to re-enter the failed information until the authentication succeeds. When the authentication succeeds, the user is taken to the webpage shown in FIG. 17.

FIG. 17 is a display diagram illustrating a server plan selection screen. The user is asked a series of questions to determine which destination server plan may be best for the user. These questions are dependent on the types of plans offered by the destination email system, and the questions in FIG. 17 are only an example of what may be asked. Once the questions in FIG. 17 are answered and the Submit button is clicked, the user can be taken to the webpage shown in FIG. 18A.

FIGS. 18A-B are display diagrams illustrating account migration planning screens. When the web page shown in FIG. 18A is arrived at, if the process that is gathering the information from the email hoster has not yet completed, then the page shows a message stating that email hoster information is being retrieved. After the process completes, or if it had completed before the customer arrived at the page, then the elements shown in FIG. 18A can be rendered on the page.

A list of all mailboxes found at the email hoster is displayed (block 1801). The user may have the ability to add additional mailboxes to the list by clicking on the Add button (block 1802) and may also be able to specify whether or not a mailbox's information should be migrated. A list of all distribution lists and/or forwarding accounts found at the Email Hoster may also be displayed (block 1803). The user may have the ability to add additional forwarding accounts by clicking on the Add buttons 1802 or 1804.

A migration customization detail screen is illustrated in FIG. 18B. The screen displays options for the user to specify how email addressed to a mailbox should be routed at the destination email system, e.g., delivered to the same email address 1811, to a different email address 1813 (making the original mailbox address an alias), to a group of email addresses 1814 (making the original mailbox address a distribution group), to a shared mailbox 1812, or to no mailbox (deleting the original mailbox address) 1815. The screen also displays options for the user to specify how existing mailbox data should be migrated to the destination email system, e.g., to the same mailbox 1816, to a different mailbox 1817, to a shared mailbox, or not to migrate the mailbox data at all 1818. Clicking the Update button 1820 saves the user's choices and returns the user to FIG. 18A. When the user has completed any changes needed on the page, the Submit button 1805 is clicked and the user may be displayed the page shown in FIG. 19.

FIG. 19 is a display diagram illustrating a subscription purchase screen. This webpage displays the recommended destination service plan and company fees (block 1901). The possibilities here are dependent on the destination computer system and email system, and on the company implementing the technology and its service offerings. Also on the page may be a set of form elements the customer may fill out to specify how they would like to pay for the service (block 1902). Once the form is complete the user can click the Submit button 1903 to be taken to the webpage shown in FIG. 20.

FIG. 20 is a display diagram illustrating a screen with user notification options. The user may be shown a synopsis of all the user mailboxes that will be created on the destination email system and have mail migrated (block 2001). On the bottom half of the page the user may be allowed to select the way in which they would like the users notified about the migration along with instructions on submitting the password to their source email mailbox so that the migration technology will have the necessary access to read the existing email from the source location during the migration step. The user can select the "Have Company Notify Your Team" tab 2002, in which case they may see the options to preview the email 2003, add a custom introduction 2004 and have the company send the notification emails 2005.

Figure 21:
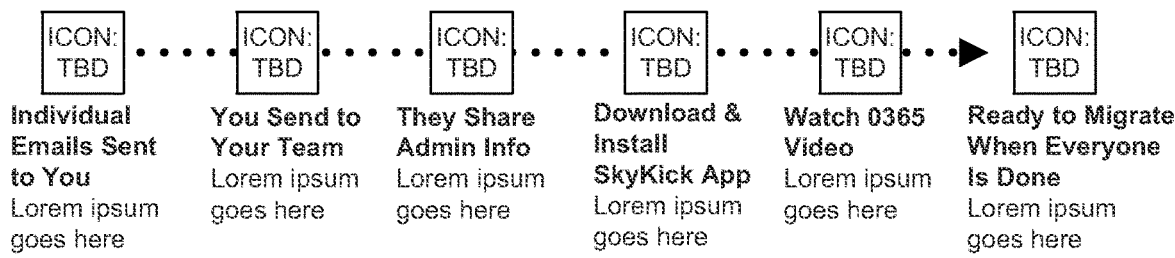
FIG. 21 is a display diagram illustrating a screen with other user notification options.

Alternatively, the user may select the "You Notify Your Team" tab 2002, in which case the technology will display the page in FIG. 21. FIG. 21 is a display diagram illustrating a screen with other user notification options. When this option is selected, the user may be able to preview the notification email 2103 and have it sent to himself or herself 2104. Once the user receives the notification email, he or she can in turn forward it to other users.

Once the user has decided how he or she would like to notify the customer's employees and clicks the "Send" button 2005 or 2104, the system sends the appropriate email and then takes the user to the page shown in FIG. 22.

FIG. 22 is a display diagram illustrating a migration preparation monitoring screen. The customer is able to see the list of their employees who have been notified to visit a web page and enter the password for their source email system mailbox. As employees open the email, visit the webpage, share their access information and/or perform any other type of action that is tracked by the system, the chart shown in block 2201 may be updated with that information. Once all users have performed all the necessary steps required to migrate their email, then the chart in FIG. 22 (block 2201) can reflect that progress and the Schedule Migration button 2202 may become enabled (it may initially be disabled). Furthermore, if the user leaves this page or closes their browser, upon returning to the website, they can be taken directly to this page and may be able to see the current migration preparation status. Once all information has been entered by all the employees, the user can click the Schedule Migration button 2202 for all the collected information to be delivered to the system datastore and for the technology to take over the remainder of the automated migration process.

It is to be understood that the subject matter defined in the appended claims is not necessarily limited to the specific structural features and/or methodological routines described above. Rather, the specific features and routines described above are disclosed as example embodiments of the claims. Accordingly, the invention is not limited except as by the appended claims.

We claim:

1. A method performed by a computing system having a processor to discover mailboxes and business rules in an email system, the method comprising:
    obtaining one or more email addresses on the email system;
    creating a social graph data structure containing obtained email addresses by creating a bi-directed graph in which vertices represent email addresses and/or messages, edges represent relationships based on existence of an address in a message header field, and directionality represents whether a message is going from or coming to a particular email address;
    classifying, by the processor, each the obtained email addresses as a mailbox, alias, forwarding rule, or distribution group, wherein classifying each of the obtained email addresses comprises:
        using, by the processor, the social graph data structure to classify one or more addresses as a mailbox, alias, forwarding rule, or distribution group by comparing a number of incoming and outgoing messages to one or more threshold values, wherein an alias is a yet-unclassified address that has at least a threshold number of messages in a mailbox that are not connected by any incoming or outgoing edge, in the social graph, to the mailbox address and has exactly one outgoing edge to the yet-unclassified address, and wherein at least one of the one or more classified addresses is associated with user credentials; and
    generating, based on the classification of each of the obtained email addresses, business rules indicating how incoming and outgoing messages associated with the classified addresses are to be distributed within the email system.

2. The method of claim 1, wherein obtaining a list of email addresses comprises:
    receiving administrative credentials for logging in to a control panel for the email system hoster; and
    executing a web automation script that logs into the email system hoster control panel, instructs the email system hoster to provide email address data, and parses the provided email address data.

3. The method of claim 1, wherein obtaining a list of email addresses comprises:
    making Web service calls to the email system for email address resolution using every letter of the location-specific alphabet and digits 0-9;
    consolidating returned addresses into a list of unique addresses; and
    expanding distribution group addresses.

4. The method of claim 1, wherein obtaining a list of email addresses comprises:
    logging into an email account having messages stored on the email system;
    scanning the headers of stored messages to parse address information from the to:, from:, cc:, and bcc: fields in each message header;
    identifying, in the address information from the scanned headers, addresses that are on the same domain as the email account; and
    consolidating identified addresses into a list of unique addresses that are on the same domain as the email account.

5. The method of claim 1, wherein classifying each of the obtained email addresses as a mailbox, alias, forwarding rule, or distribution group comprises:
    attempting to log in to an obtained email address, wherein attempting to log in to the address generates a login attempt failure response code; and
    using the login attempt failure response code to distinguish mailbox addresses from distribution group addresses.

6. The method of claim 1, wherein using the social graph data structure to classify one or more addresses comprises classifying a second yet-unclassified address as a mailbox if a number of incoming edges above a first threshold value and a number of outgoing edges above a second, possibly different, threshold value exist to a particular email address vertex, the email address corresponding to that vertex is classified as a mailbox.

7. The method of claim 1, further comprising classifying at least one of the obtained email addresses as being associated with a second email system, different from the email system, based on the social graph data structure.

8. The method of claim 1, wherein using the social graph data structure to classify one or more addresses comprises classifying a second yet-unclassified address as a distribution group if the number of messages in a plurality of mailboxes not connected by any incoming or outgoing edge to the addresses of the mailboxes they are in is at least a given threshold value, and if the messages in the plurality of mailboxes have exactly one outgoing edge to the second yet-unclassified address.

9. The method of claim 1, wherein using the social graph data structure to classify one or more addresses comprises reclassifying a mailbox-classified address as a forwarding rule if of the messages in the mailbox not connected by any incoming or outgoing edge to the mailbox address is at least a given threshold value, and if the messages in the mailbox have exactly one outgoing edge to the mailbox-classified address.

10. A system in an electronic device having a processor for automating a project of data migration from a source email system to a destination email system, the system comprising:
    an input component configured to receive a domain name associated with the source email system;
    a domain component configured to obtain domain name system (DNS) records for the received domain name;
    a hoster discovery component configured to determine an email hosting provider for the source email system;
    a hoster integration component configured to determine, based on the obtained DNS records, an email system service type of the source email system;
    a mailbox discovery component configured to discover and classify one or more mailboxes in the source email system, by:
        obtaining one or more email addresses on the email system;
        creating a social graph data structure containing obtained email addresses by creating a bi-directed graph in which vertices represent email addresses and/or messages, edges represent relationships based on existence of an address in a message header field, and directionality represents whether a message is going from or coming to a particular email address;
        classifying, by the processor, each the obtained email addresses as a mailbox, alias, forwarding rule, or distribution group, wherein classifying each of the obtained email addresses comprises:
            using, by the processor, the social graph data structure to classify one or more addresses as a mailbox, alias, forwarding rule, or distribution group by comparing a number of incoming and outgoing messages to one or more threshold values, wherein at least one of the one or more classified addresses is associated with user credentials;

determining that at least one of the obtained email addresses is unclassified by the social graph data structure;

detecting additional information associated with the email system;

creating a second social graph data structure, based on the additional information, contained obtained email addresses; and classifying the unclassified obtained email address using the second social graph data structure;

generating, based on the classification of each of the obtained email addresses, business rules indicating how incoming and outgoing messages associated with the classified addresses are to be distributed within the email system;

a migration options component configured to display customization options for migrating discovered source email system mailboxes;

a migration sync component configured to migrate data items from the source email system to the destination email system; and a migration management component configured to manage migration of data from source email system client computing devices to the destination email system.

11. The system of claim 10, wherein the mailbox discovery component is configured to automatically obtain a list of one or more email addresses on the source email system by:

receiving administrative credentials for logging in to a control panel for the source email system;

logging in to the source email system control panel using the received credentials;

instructing the source email system to provide email address data relating to the source email system; and parsing the provided email address data.

12. The system of claim 10, wherein the mailbox discovery component is configured to automatically obtain a list of one or more email addresses on the source email system by:

determining a location-specific alphabet;

for each letter of the location-specific alphabet and each digit 0-9, making a call to the email system for email address resolution;

consolidating addresses returned from each address resolution call into a list of unique addresses;

identifying one or more of the consolidated addresses as distribution group addresses; and expanding the distribution group addresses.

13. The system of claim 10, wherein the mailbox discovery component is configured to automatically obtain a list of one or more email addresses on the source email system by:

receiving login credentials for logging in to an email account having one or more messages on the source email system;

logging in to the email account using the received credentials;

scanning the headers of the one or more messages to parse address information from the to:, from:, cc:, and bcc: fields in each message header;

identifying, in the address information from the scanned headers, addresses that are on the same domain as the email account; and consolidating identified addresses into a list of unique addresses that are on the same domain as the email account.

14. The system of claim 10, wherein the mailbox discovery component is further configured to automatically classify each of the obtained email addresses as a mailbox, alias, forwarding rule, or distribution group by:

for each of at least one address in the list of one or more email addresses on the source email system:

attempting to log in to the address without using credentials associated with the address;

recording a login attempt failure response code from the failed login attempt; and using the login attempt failure response code to determine whether to classify the address as a mailbox address or a distribution group address.

15. The system of claim 10, wherein the mailbox discovery component is configured to use the social graph data structure to classify an address by:

determining, for a vertex in the bi-directed graph corresponding to a yet-unclassified address, a first number of incoming edges and a second number of outgoing edges; and classifying the yet-unclassified address as a mailbox if the first number is above a first threshold and the second number is above a second threshold.

16. The system of claim 10, wherein the mailbox discovery component is configured to use the social graph data structure to classify an address by:

classifying a yet-unclassified address as an alias to a mailbox address if, for at least a threshold number of messages in the mailbox corresponding to the mailbox address:

the message is not connected by any incoming or outgoing edge to the mailbox address, and the message has exactly one outgoing edge to the yet-unclassified address.

17. The system of claim 10, wherein the mailbox discovery component is configured to use the social graph data structure to classify an address by:

classifying a yet-unclassified address as a distribution group if, for at least a threshold number of messages in a plurality of mailboxes, wherein each message is in a mailbox:

the message is not connected by any incoming or outgoing edge to the address of the mailbox it is in; and the message has exactly one outgoing edge to the yet-unclassified address.

18. The system of claim 10, wherein the mailbox discovery component is configured to use the social graph data structure to classify an address by:

reclassifying a mailbox-classified address as a forwarding rule if, for at least a threshold number of messages in the mailbox corresponding to the mailbox address:

the message is not connected by any incoming or outgoing edge to the mailbox address, and the message has exactly one outgoing edge to the yet-unclassified address.

19. A computer-readable storage device storing computer-executable instructions for causing a first computing system having a processor to perform a method for automating a project of data migration from a source email system of a second computing system to a destination email system, comprising:

receiving a domain name of the second computing system;

obtaining domain name system (DNS) records for the received domain name;

determining an email hosting provider for the second computing system;

determining, by the processor, based on the obtained DNS records, an email system service type of the source email system on the second computing system;

determining mailboxes and business rules of the source email system, wherein the business rules indicate how incoming and outgoing messages of the source email system are distributed, and wherein determining mailboxes and business rules of the source email system comprises:

obtaining one or more email addresses on the source email system; and classifying, by the processor, each of the obtained email addresses as a mailbox, alias, forwarding rule, or distribution group, wherein classifying the obtained email addresses comprises:

creating a social graph data structure containing obtained email addresses of the source email system by creating a bi-directed graph in which vertices represent email addresses and/or messages, edges represent relationships based on existence of an address in a message header field, and directionality represents whether a message is going from or coming to a particular email address; and using, by the processor, the social graph data structure to classify the obtained email addresses as a mailbox, alias, forwarding rule, or distribution group by comparing the number of incoming and outgoing edges to threshold values, wherein an alias is a yet-unclassified address that has at least a threshold number of messages in a mailbox that are not connected by any incoming or outgoing edge to the mailbox address and has exactly one outgoing edge to the yet-unclassified address, and wherein at least one of the classified email addresses is associated with user credentials;

displaying customization options for migrating determined source email system mailboxes;

migrating data items from the source email system to the destination email system, wherein the migrated data items comprises the business rules; and managing migration of data from source email system client computing devices to the destination email system.

20. The computer-readable storage device of claim 19, wherein obtaining a list of email addresses comprises:

receiving administrative credentials for logging in to a control panel for the email system hoster; and executing a web automation script that logs into the email system hoster control panel, instructs the email system hoster to provide email address data, and parses the provided email address data.

21. The computer-readable storage device of claim 19, wherein obtaining a list of email addresses comprises:

making Web service calls to the email system for email address resolution using every letter of the location-specific alphabet and digits 0-9;

consolidating returned addresses into a list of unique addresses; and expanding distribution group addresses.

22. The computer-readable storage device of claim 19, wherein obtaining a list of email addresses comprises:

logging into an email account having messages stored on the email system;

scanning the headers of stored messages to parse address information from the to:, from:, cc:, and bcc: fields in each message header;

identifying, in the address information from the scanned headers, addresses that are on the same domain as the email account; and consolidating identified addresses into a list of unique addresses that are on the same domain as the email account.

23. The computer-readable storage device of claim 19, wherein classifying each of the obtained email addresses as a mailbox, alias, forwarding rule, or distribution group comprises:

attempting to log in to an obtained email address, wherein attempting to log in to the address generates a login attempt failure response code; and using the login attempt failure response code to distinguish mailbox addresses from distribution group addresses.

24. The computer-readable storage device of claim 19, wherein using the social graph data structure to classify one or more addresses comprises classifying a yet-unclassified address as a mailbox if a number of incoming edges above a first threshold value and a number of outgoing edges above a second, possibly different, threshold value exist to a particular email address vertex, the email address corresponding to that vertex is classified as a mailbox.

25. The computer-readable storage device of claim 19, wherein using the social graph data structure to classify one or more addresses comprises classifying a yet-unclassified address as an alias to a mailbox address if the number of messages in the mailbox not connected by any incoming or outgoing edge to the mailbox address is greater than or equal to a given threshold value, and if the messages in the mailbox have exactly one outgoing edge to the yet-unclassified address.

26. The computer-readable storage device of claim 19, wherein using the social graph data structure to classify one or more addresses comprises classifying a yet-unclassified address as a distribution group if the number of messages in a plurality of mailboxes not connected by any incoming or outgoing edge to the addresses of the mailboxes they are in is greater than or equal to a given threshold value, and if the messages in the plurality of mailboxes have exactly one outgoing edge to the yet-unclassified address.

27. The computer-readable storage device of claim 19, wherein using the social graph data structure to classify one or more addresses comprises reclassifying a mailbox-classified address as a forwarding rule if the number of messages in the mailbox not connected by any incoming or outgoing edge to the mailbox address is greater than or equal to a given threshold value, and if the messages in the mailbox have exactly one outgoing edge to the yet-unclassified address.

* * * * *